US011921681B2

(12) United States Patent
Natesan et al.

(10) Patent No.: US 11,921,681 B2
(45) Date of Patent: Mar. 5, 2024

(54) MACHINE LEARNING TECHNIQUES FOR PREDICTIVE STRUCTURAL ANALYSIS

(71) Applicant: Optum Technology, Inc., Eden Prairie, MN (US)

(72) Inventors: Vijaychandar Natesan, Bangalore (IN); Ramesh R. Ganesan, Bangalore (IN); Rakesh P A, Bengaluru (IN); Rahul Singh, Bengaluru (IN); Sarath C Varma Kutcharlapati, Vizianagaram (IN); Varunkumar Akula, Karimnagar (IN)

(73) Assignee: Optum Technology, Inc., Eden Prairie, MN (US)

(*) Notice: Subject to any disclaimer, the term of this patent is extended or adjusted under 35 U.S.C. 154(b) by 0 days.

(21) Appl. No.: 17/344,489

(22) Filed: Jun. 10, 2021

(65) Prior Publication Data
US 2022/0342857 A1 Oct. 27, 2022

(30) Foreign Application Priority Data

Apr. 22, 2021 (IN) .............................. 202111018632

(51) Int. Cl.
G06F 16/21 (2019.01)
G06F 16/22 (2019.01)
G06F 16/25 (2019.01)
G06F 16/28 (2019.01)
G06N 5/04 (2023.01)
(Continued)

(52) U.S. Cl.
CPC ........ *G06F 16/211* (2019.01); *G06F 16/2264* (2019.01); *G06F 16/2282* (2019.01); *G06F 16/25* (2019.01); *G06F 16/285* (2019.01); *G06N 5/04* (2013.01); *G06N 20/00* (2019.01); *G06N 20/20* (2019.01)

(58) Field of Classification Search
CPC ............... G06F 16/211; G06F 16/2264; G06F 16/2282; G06F 16/25; G06F 16/285; G06N 20/20
USPC ........................................................ 707/732
See application file for complete search history.

(56) References Cited

U.S. PATENT DOCUMENTS

| 6,912,549 B2 | 6/2005 | Rotter et al. |
| 7,809,672 B1* | 10/2010 | Tenorio .............. G06Q 30/0629 707/694 |
| 9,542,456 B1 | 1/2017 | Das et al. |

(Continued)

OTHER PUBLICATIONS

"Can AI Fix Healthcare Provider Directories?," CAQH|Medium, Mar. 18, 2019, (5 pages), [Retrieved from the Internet Aug. 11, 2021] <https://caqh.medium.com/can-ai-fix-healthcare-provider-directories-eb55c0616c78>.
"Total Directory Resolution, "LexisNexis Risk Solutions, 2018, (5 pages), (article), [Retrieved from the Internet Aug. 11, 2021] <https://www.google.com/url?sa=t&rct=j&q=&esrc=s&source=web &cd=&cad=rja&uact=8&ved=2ahUKEwi11OG3nL_uAhWabc0KHcbZAlsQFjAAeg lQIAxAC&url=https%3A%2F%2Frisk.lexisnexis.com%2F.

(Continued)

*Primary Examiner* — Kuen S Lu
(74) *Attorney, Agent, or Firm* — Alston & Bird LLP

(57) ABSTRACT

Various embodiments of the present invention provide methods, apparatus, systems, computing devices, computing entities, and/or the like for performing predictive structural analysis. Certain embodiments of the present invention utilize systems, methods, and computer program products that perform predictive structural analysis using at least one of table column classification machine learning models, table column clustering machine learning models, structural variance generation machine learning models, and emergence report generation machine learning models.

17 Claims, 13 Drawing Sheets

(51) Int. Cl.
   *G06N 20/00*    (2019.01)
   *G06N 20/20*    (2019.01)

(56) References Cited

U.S. PATENT DOCUMENTS

| | | | |
|---|---|---|---|
| 10,185,929 | B2 | 1/2019 | Kharraz Tavakol et al. |
| 10,997,194 | B1* | 5/2021 | Tadepally ............. G06F 16/212 |
| 2005/0097150 | A1 | 5/2005 | McKeon et al. |
| 2014/0279972 | A1 | 9/2014 | Singh et al. |
| 2015/0095022 | A1 | 4/2015 | Xu et al. |
| 2016/0371275 | A1* | 12/2016 | Bernstein ............. G06F 40/169 |
| 2018/0075104 | A1* | 3/2018 | Oberbreckling ...... G06F 16/254 |
| 2021/0149896 | A1* | 5/2021 | Yu ....................... G06F 16/2456 |
| 2022/0019936 | A1* | 1/2022 | Sarda ....................... G06N 7/01 |
| 2022/0121890 | A1* | 4/2022 | Sherman ................. G06T 11/20 |
| 2022/0343191 | A1 | 10/2022 | Natesan et al. |

OTHER PUBLICATIONS

Cook, Matthew J. et al. "Facilitating Accurate Health Provider Directories Using Natural Language Processing." BMC Medical Informatics and Decision Making, vol. 19, Supplement 3:80, Apr. 4, 2019, pp. 99-106, https://doi.org/10.1186/s12911-019-0788-x.

Gregg, Forest, "Modem Approaches To Schema Matching," DataMade, Dec. 12, 2017, (20 pages), [Retrieved from the Internet Aug. 11, 2021] <https://datamade.us/blog/schema-matching/>.

Rachapudi, Nikitha et al. "Discovery of Structured Data Using Unsupervised Spatial Clustering and Human Supervision," International Journal of Machine Learning and Computing, vol. 9, No. 5, Oct. 2019, pp. 586-591.

* cited by examiner

| Col_1 | provider_first_name |
|---|---|
| Col_2 | provider_last_name |
| Col_3 | provider_full_address |
| Col_4 | NULL |

MACHINE LEARNING TECHNIQUES FOR PREDICTIVE STRUCTURAL ANALYSIS

CROSS-REFERENCES TO RELATED APPLICATION(S)

The present application claims priority to Indian Provisional Patent Application No. 202111018632 (filed on Apr. 22, 2021), which is incorporated by reference herein in its entirety.

BACKGROUND

Various embodiments of the present invention address technical challenges related to performing predictive structural analysis and provide solutions to address the efficiency and reliability shortcomings of existing predictive structural analysis solutions.

BRIEF SUMMARY

In general, various embodiments of the present invention provide methods, apparatus, systems, computing devices, computing entities, and/or the like for performing predictive structural analysis. Certain embodiments of the present invention utilize systems, methods, and computer program products that perform predictive structural analysis using at least one of table column classification machine learning models, table column clustering machine learning models, structural variance generation machine learning models, and emergence report generation machine learning models.

In accordance with one aspect, a method is provided. In one embodiment, the method comprises: for each table column: generating, using a header-based table classification machine learning model of a plurality of classification machine learning models and based at least in part on a table column name set for the table column, a predicted header-based column type of a plurality of predicted column types for the table column and a header-based column type voting weight of a plurality of column type voting weights for the predicted header-based column type, generating, using a data-based table classification machine learning model of the plurality of classification machine learning models and based at least in part on a table column value set for the table column, a predicted data-based column type of the plurality of predicted column types for the table column and a data-based column type voting weight of the plurality of column type voting weights for the predicted data-based column type, generating, using an entity recognition classification machine learning model of the plurality of classification machine learning models and based at least in part on the table column value set, a predicted entity-recognition-based column type of the plurality of predicted column types for the table column and an entity-recognition-based column type voting weight of the plurality of column type voting weights for the predicted entity-recognition-based column type, generating, using a pattern matching classification machine learning model of the plurality of classification machine learning models and based at least in part on the table column name set, a predicted pattern-machine-based column type of the plurality of predicted column types for the table column and a pattern-matching-based column type voting weight of the plurality of column type voting weights for the predicted entity-recognition-based column type, and generating, using a voting machine learning model and based at least in part on the plurality of predicted column types and the plurality of column type voting weights, an overall column type prediction for the table column; and performing one or more prediction-based actions based at least in part on each overall column type prediction for a table column.

In accordance with another aspect, a computer program product is provided. The computer program product may comprise at least one computer-readable storage medium having computer-readable program code portions stored therein, the computer-readable program code portions comprising executable portions configured to: for each table column: generating, using a header-based table classification machine learning model of a plurality of classification machine learning models and based at least in part on a table column name set for the table column, a predicted header-based column type of a plurality of predicted column types for the table column and a header-based column type voting weight of a plurality of column type voting weights for the predicted header-based column type, generating, using a data-based table classification machine learning model of the plurality of classification machine learning models and based at least in part on a table column value set for the table column, a predicted data-based column type of the plurality of predicted column types for the table column and a data-based column type voting weight of the plurality of column type voting weights for the predicted data-based column type, generating, using an entity recognition classification machine learning model of the plurality of classification machine learning models and based at least in part on the table column value set, a predicted entity-recognition-based column type of the plurality of predicted column types for the table column and an entity-recognition-based column type voting weight of the plurality of column type voting weights for the predicted entity-recognition-based column type, generating, using a pattern matching classification machine learning model of the plurality of classification machine learning models and based at least in part on the table column name set, a predicted pattern-machine-based column type of the plurality of predicted column types for the table column and a pattern-matching-based column type voting weight of the plurality of column type voting weights for the predicted entity-recognition-based column type, and generating, using a voting machine learning model and based at least in part on the plurality of predicted column types and the plurality of column type voting weights, an overall column type prediction for the table column; and performing one or more prediction-based actions based at least in part on each overall column type prediction for a table column.

In accordance with yet another aspect, an apparatus comprising at least one processor and at least one memory including computer program code is provided. In one embodiment, the at least one memory and the computer program code may be configured to, with the processor, cause the apparatus to: for each table column: generating, using a header-based table classification machine learning model of a plurality of classification machine learning models and based at least in part on a table column name set for the table column, a predicted header-based column type of a plurality of predicted column types for the table column and a header-based column type voting weight of a plurality of column type voting weights for the predicted header-based column type, generating, using a data-based table classification machine learning model of the plurality of classification machine learning models and based at least in part on a table column value set for the table column, a predicted data-based column type of the plurality of predicted column types for the table column and a data-based column type voting weight of the plurality of column type voting weights for the predicted data-based column type, generating, using an entity recognition classification machine learning model of the plurality of classification machine learning models and based at least in part on the table column value set, a predicted entity-recognition-based column type of the plurality of predicted column types for the table column and an entity-recognition-based column type voting weight of the plurality of column type voting weights for the predicted entity-recognition-based column type, generating, using a pattern matching classification machine learning model of the plurality of classification machine learning models and based at least in part on the table column name set, a predicted pattern-machine-based column type of the plurality of predicted column types for the table column and a pattern-matching-based column type voting weight of the plurality of column type voting weights for the predicted entity-recognition-based column type, and generating, using a voting machine learning model and based at least in part on the plurality of predicted column types and the plurality of column type voting weights, an overall column type prediction for the table column; and performing one or more prediction-based actions based at least in part on each overall column type prediction for a table column.

In accordance with another aspect, a method is provided. In one embodiment, the method comprises: identifying a reference table data object associated with the table data object that comprises a plurality of reference table columns; for each table column pair that comprises a table column of the table data object and a reference table column of the reference table data object, determining a table column pair similarity measure; determining, based at least in part on each table column pair similarity measure for a table column pair, a variance report for the table data object; and performing one or more prediction-based actions based at least in part on the variance report.

In accordance with another aspect, a computer program product is provided. The computer program product may comprise at least one computer-readable storage medium having computer-readable program code portions stored therein, the computer-readable program code portions comprising executable portions configured to: identify a reference table data object associated with the table data object that comprises a plurality of reference table columns; for each table column pair that comprises a table column of the table data object and a reference table column of the reference table data object, determine a table column pair similarity measure; determine, based at least in part on each table column pair similarity measure for a table column pair, a variance report for the table data object; and perform one or more prediction-based actions based at least in part on the variance report.

In accordance with yet another aspect, an apparatus comprising at least one processor and at least one memory including computer program code is provided. In one embodiment, the at least one memory and the computer program code may be configured to, with the processor, cause the apparatus to: identify a reference table data object associated with the table data object that comprises a plurality of reference table columns; for each table column pair that comprises a table column of the table data object and a reference table column of the reference table data object, determine a table column pair similarity measure; determine, based at least in part on each table column pair similarity measure for a table column pair, a variance report for the table data object; and perform one or more prediction-based actions based at least in part on the variance report.

BRIEF DESCRIPTION OF THE DRAWINGS

Figure 1:
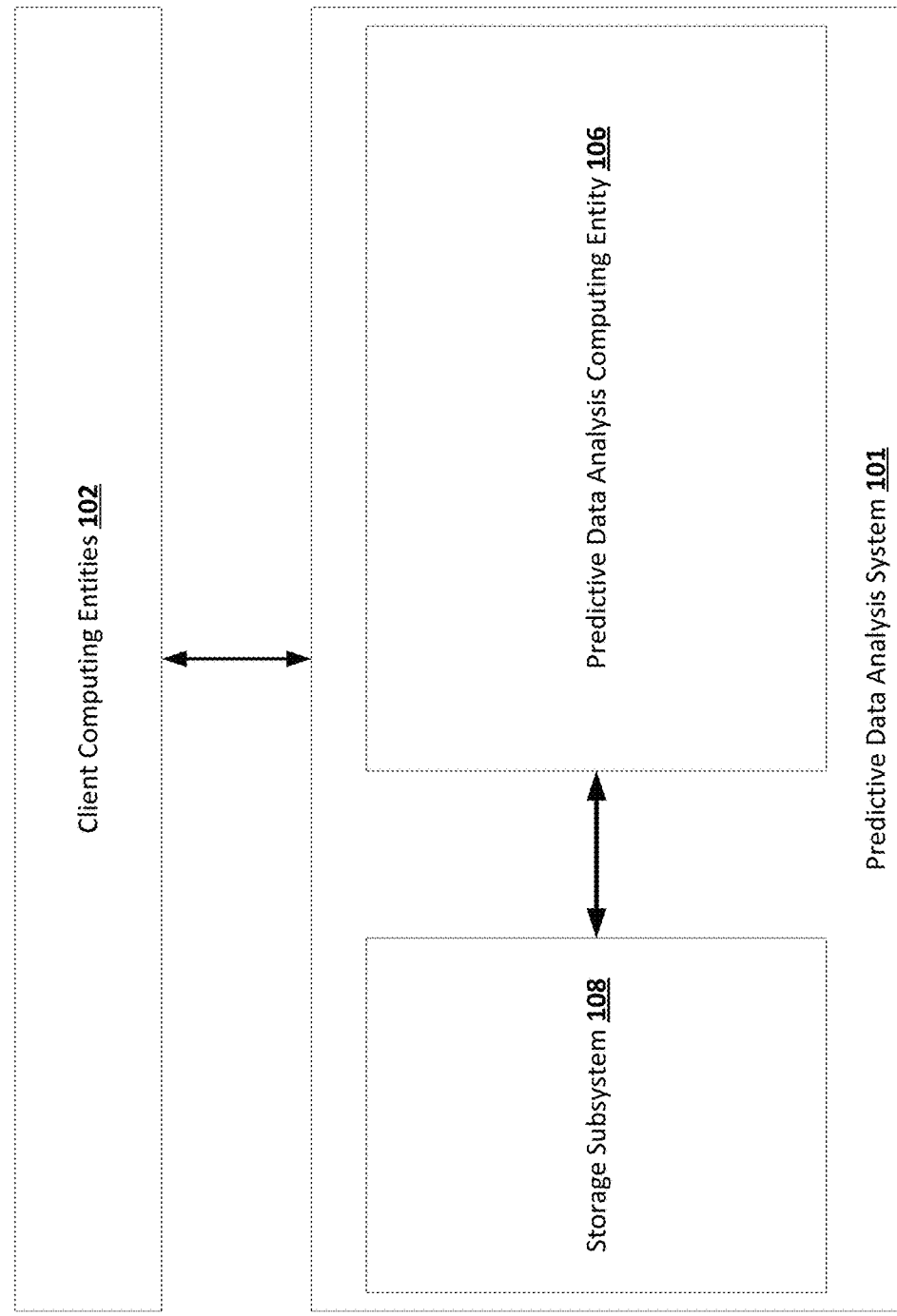

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
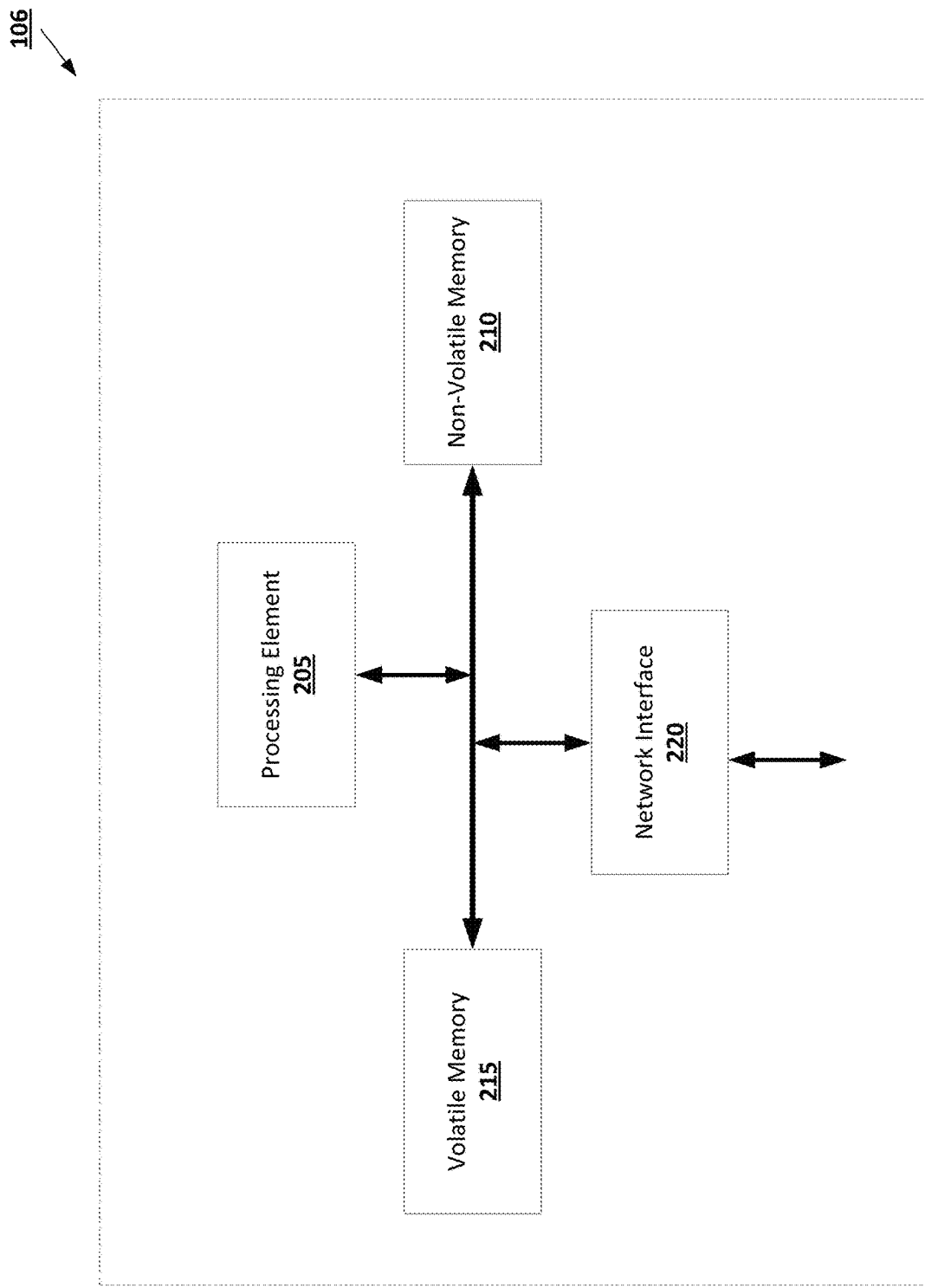

FIG. 2 provides an example predictive data analysis computing entity in accordance with some embodiments discussed herein.

Figure 3:
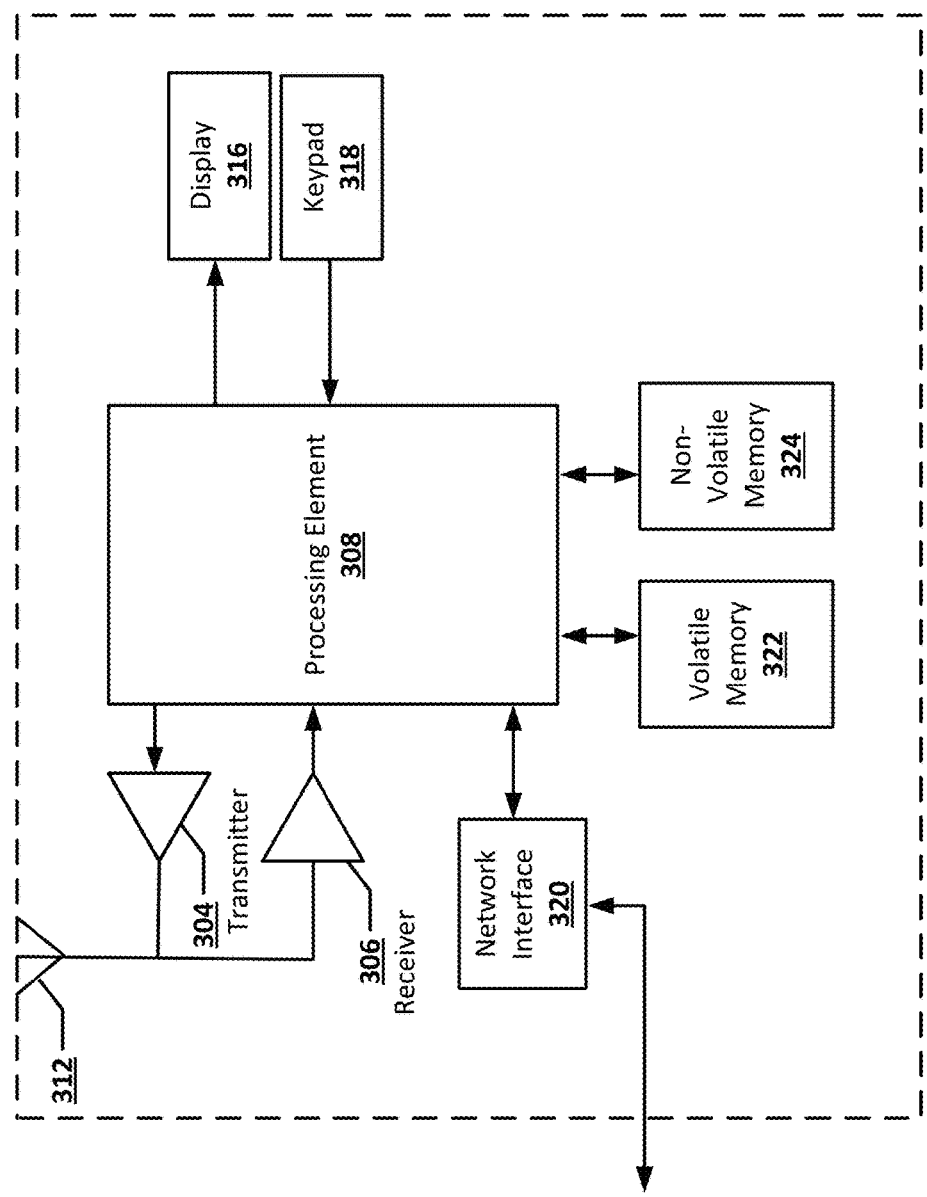

FIG. 3 provides an example client computing entity in accordance with some embodiments discussed herein.

Figure 4:
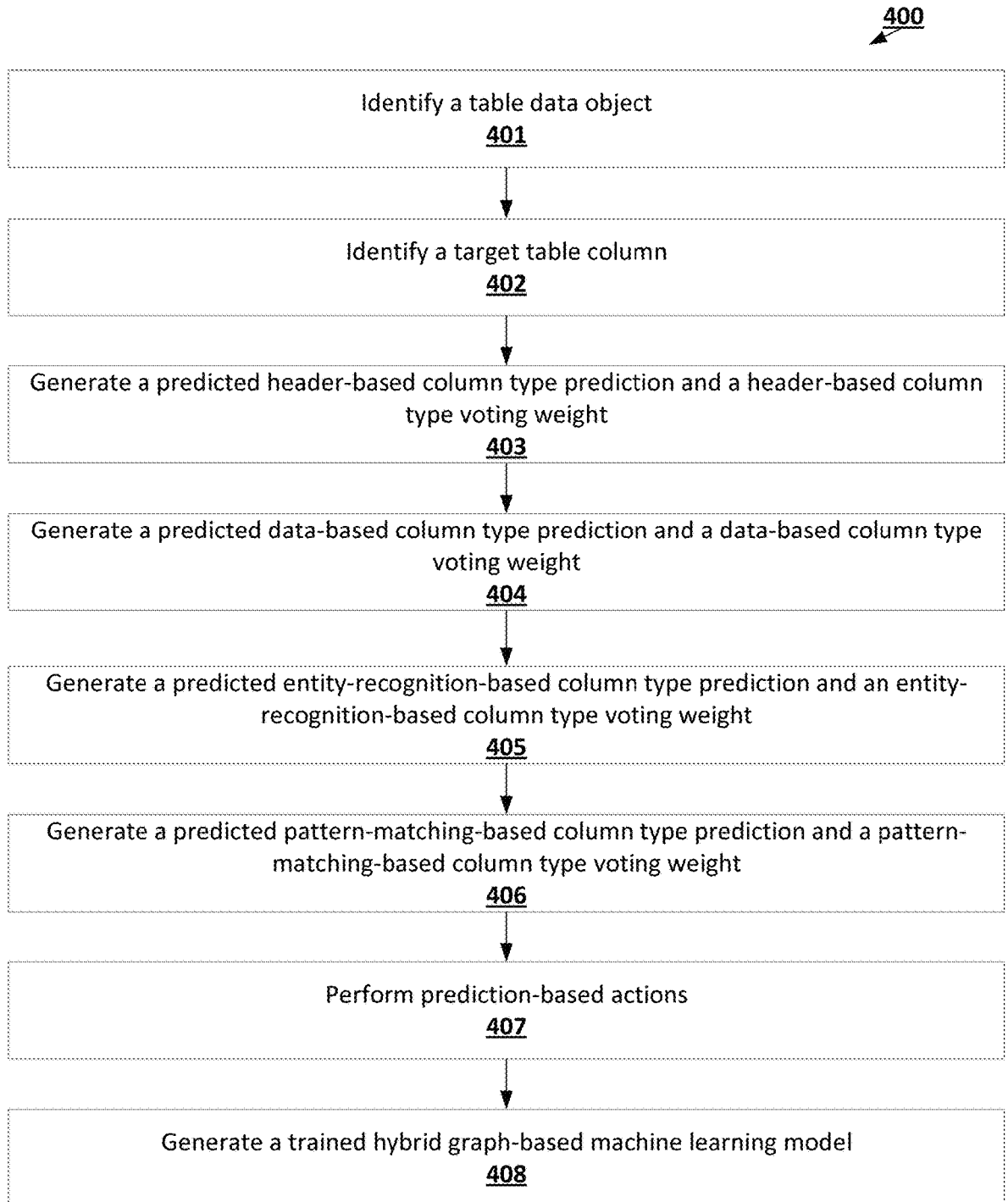

FIG. 4 is a flowchart diagram of an example process for performing table column identification for a table column in a table data object in accordance with some embodiments discussed herein.

Figure 5:
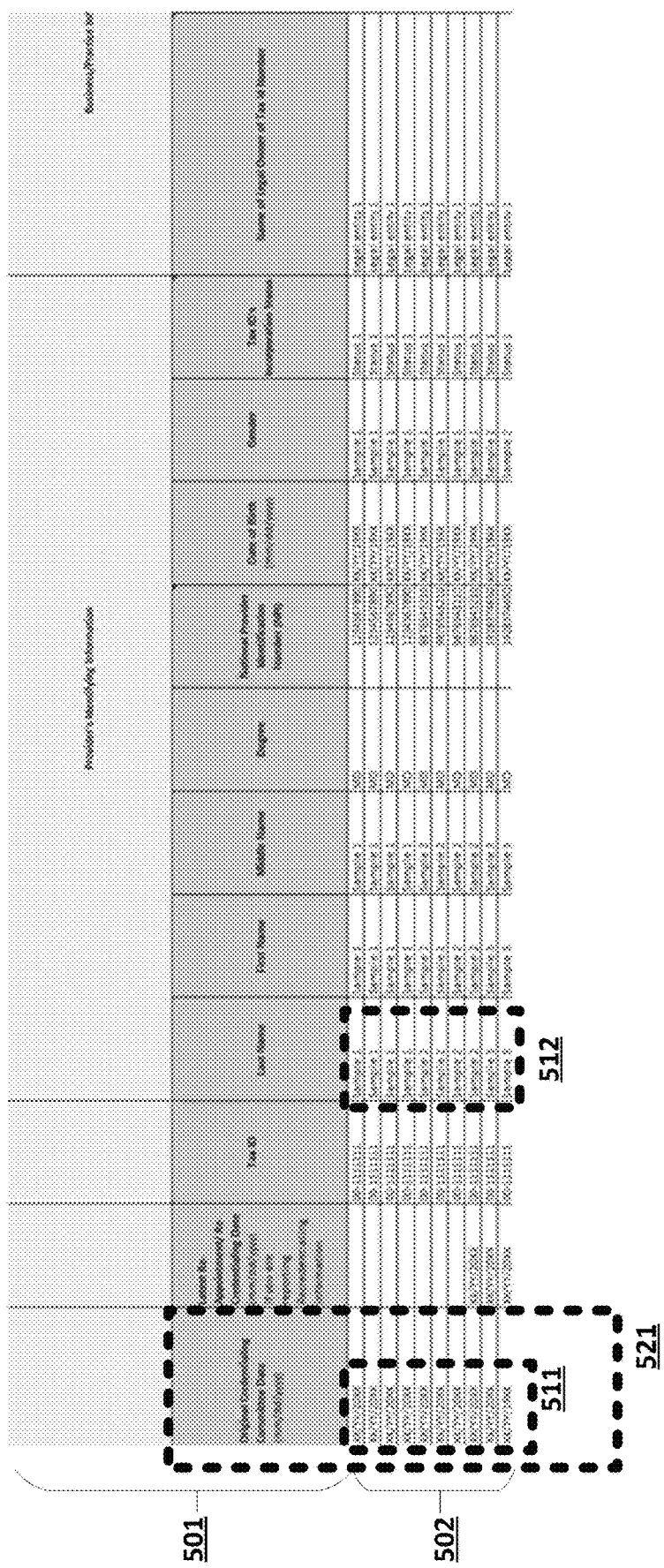

FIG. 5 provides an operational example of a collection of structured data cells that may be used to generate a table data object in accordance with some embodiments discussed herein.

Figure 6:
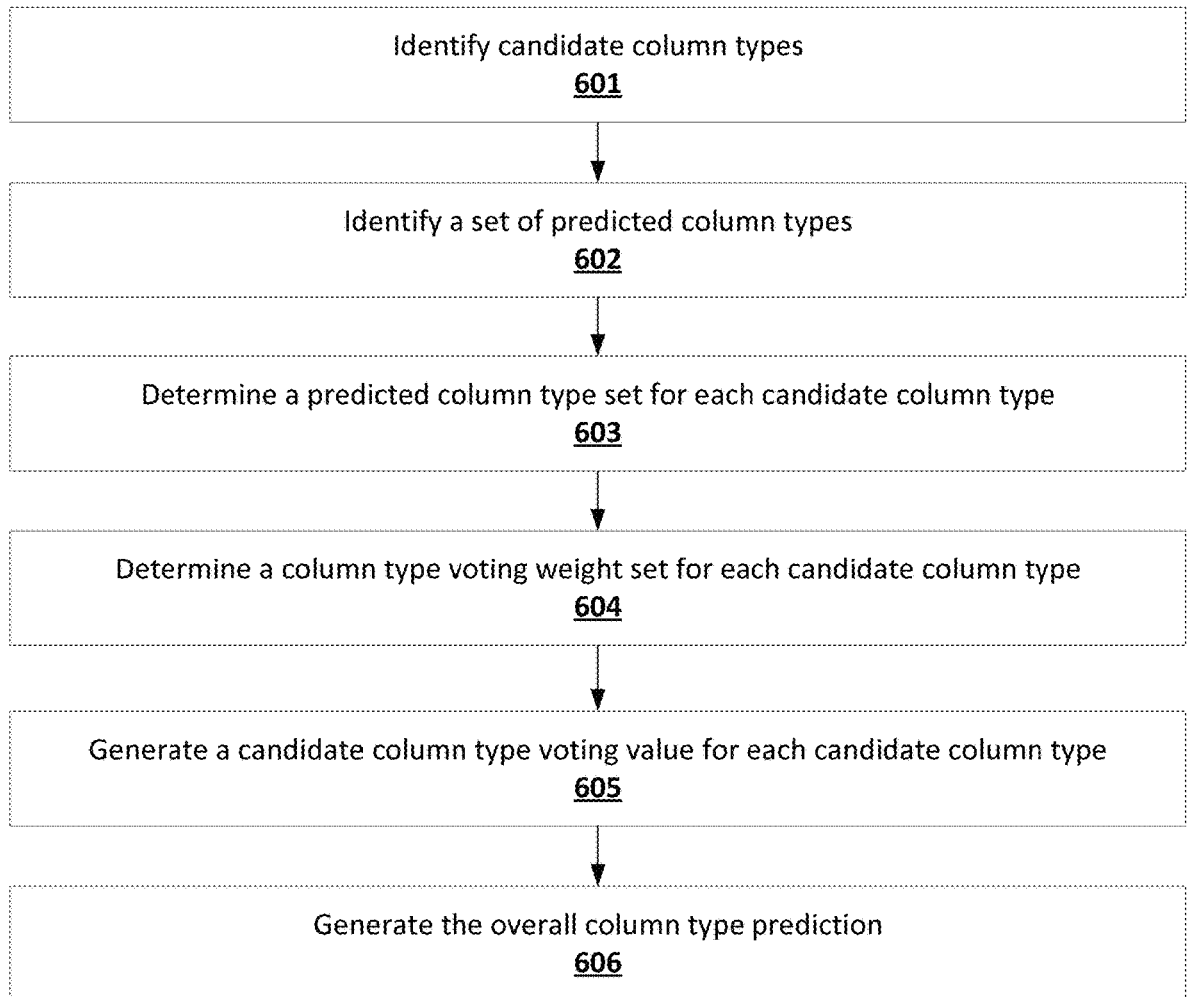

FIG. 6 is a flowchart diagram of an example process for generating an overall column type prediction for a table column in accordance with some embodiments discussed herein.

FIG. 7 provides an operational example of a prediction output user interface depicting overall column type predictions for a set of table columns in accordance with some embodiments discussed herein.

Figure 8:
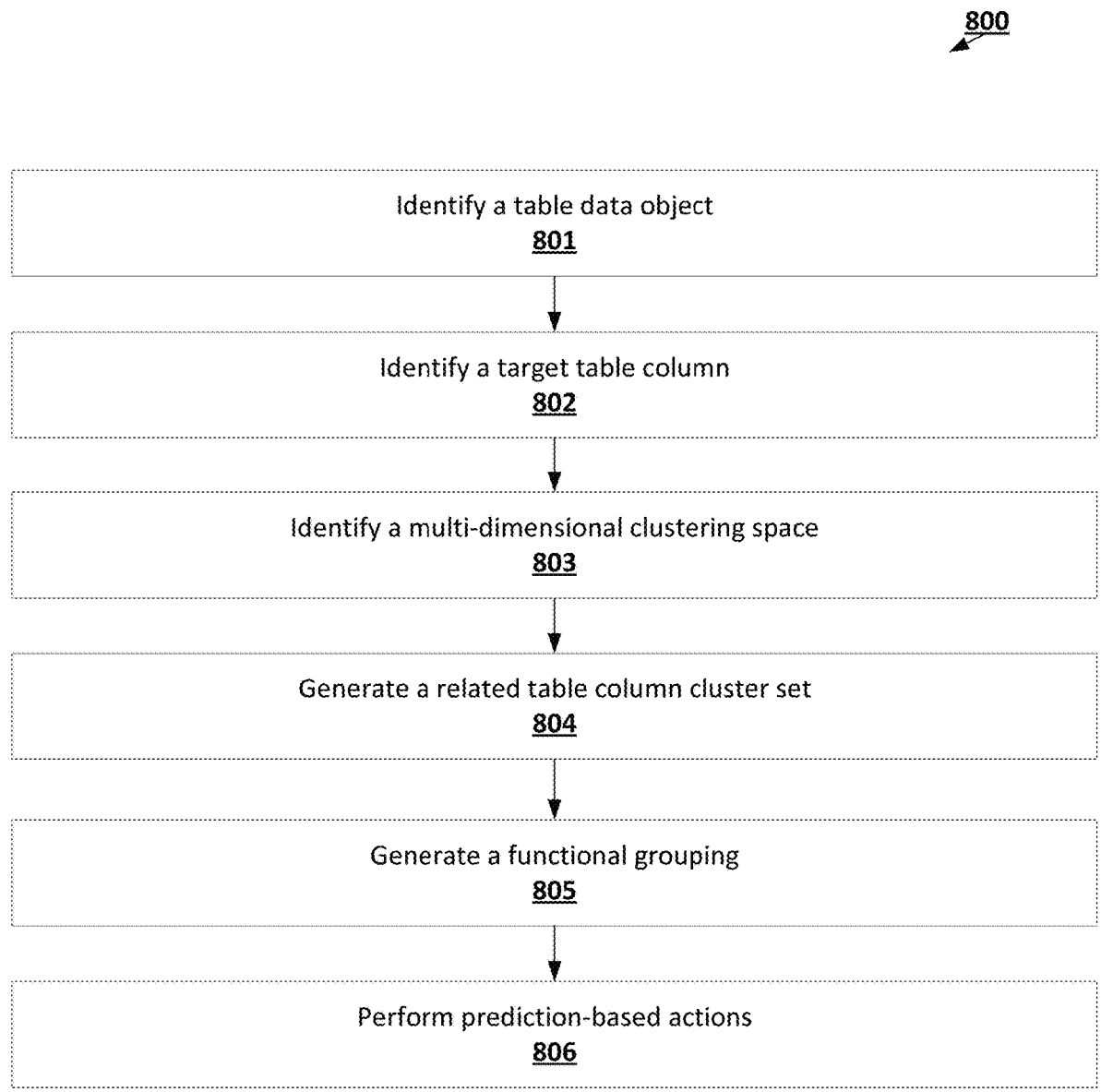

FIG. 8 is a flowchart diagram of an example process for generating a functional grouping for a table column in accordance with some embodiments discussed herein.

Figure 9:
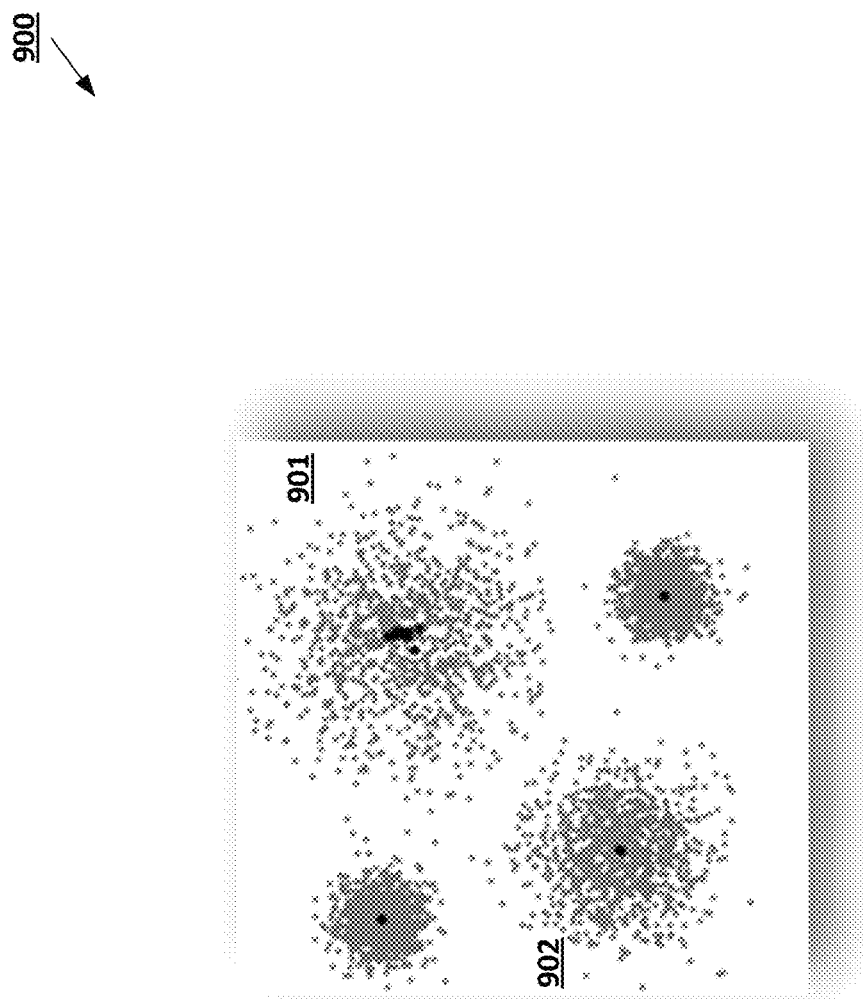

FIG. 9 provides an operational example of a multi-dimensional clustering space in accordance with some embodiments discussed herein.

Figure 10:
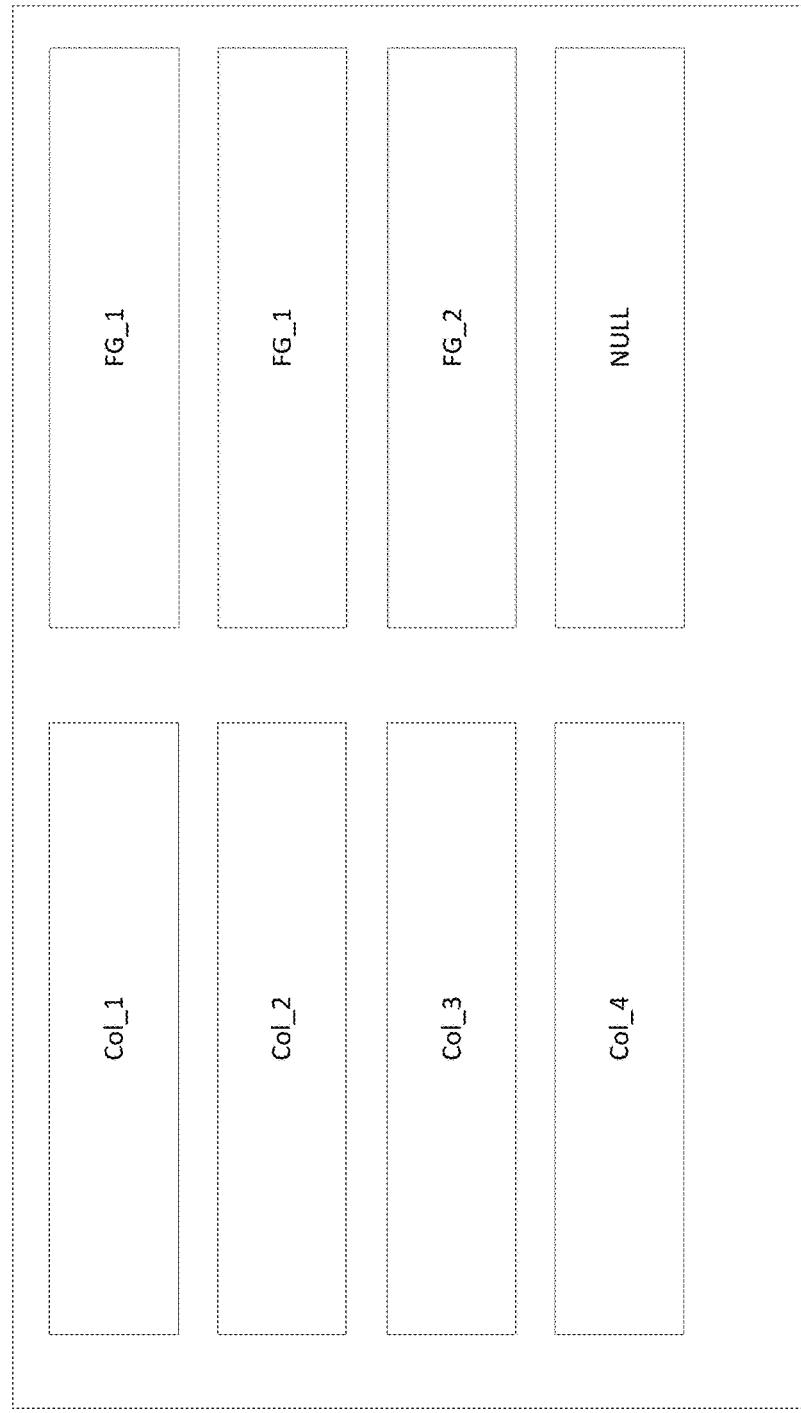

FIG. 10 provides an operational example of a prediction output user interface depicting a set of functional groupings in accordance with some embodiments discussed herein.

Figure 11:
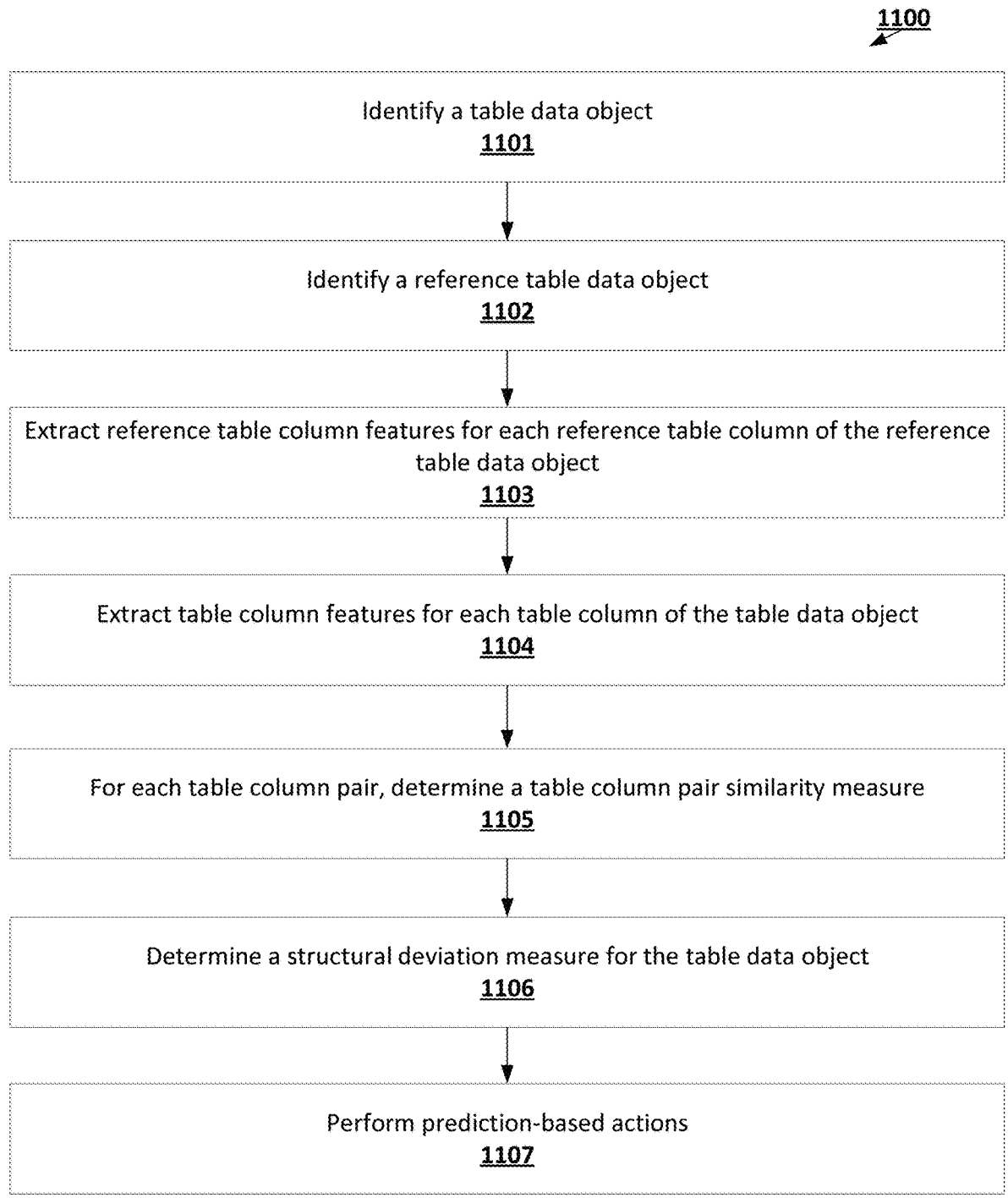

FIG. 11 is a flowchart diagram of an example process for generating a variance report for a table data object in accordance with some embodiments discussed herein.

Figure 12:
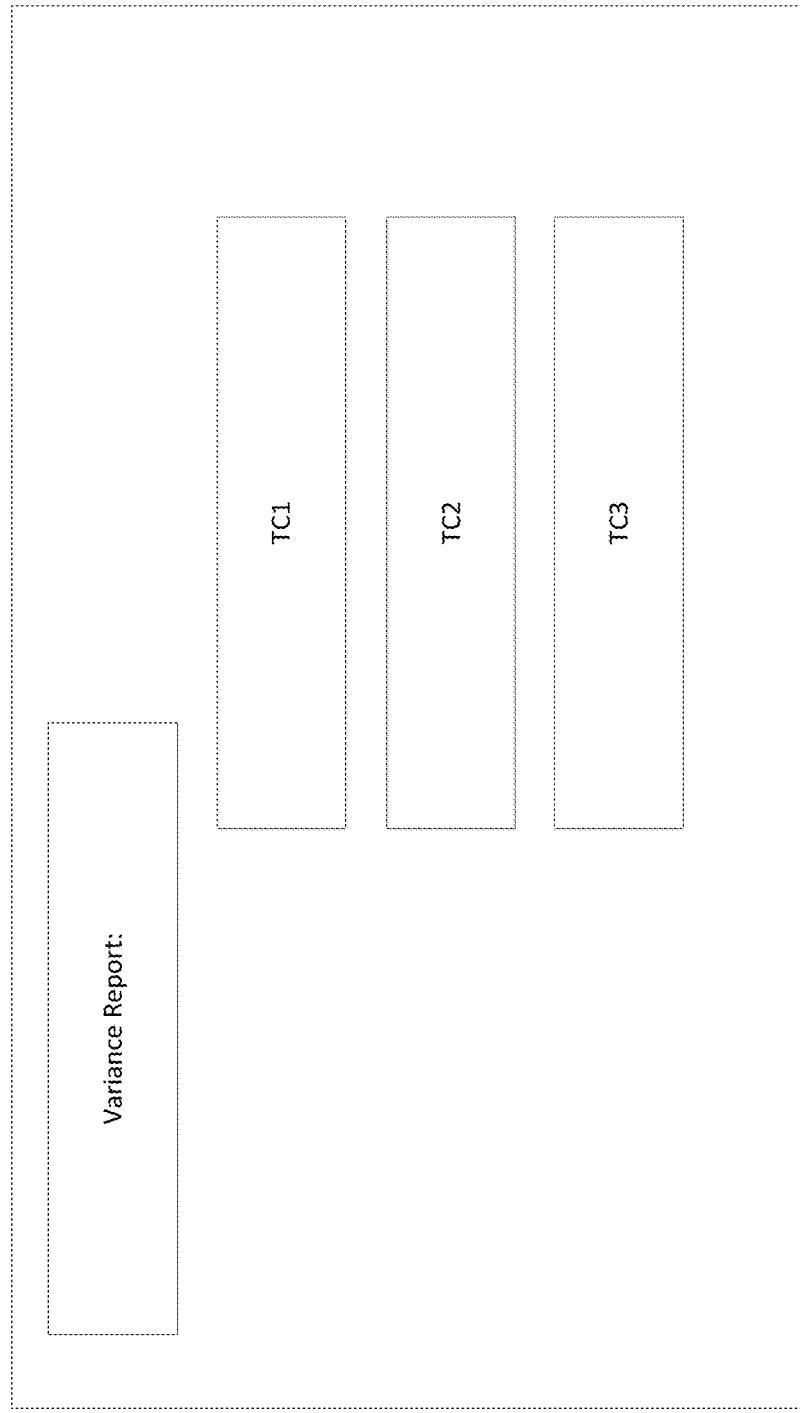

FIG. 12 provides an operational example of a prediction output user interface depicting a variance report in accordance with some embodiments discussed herein.

Figure 13:
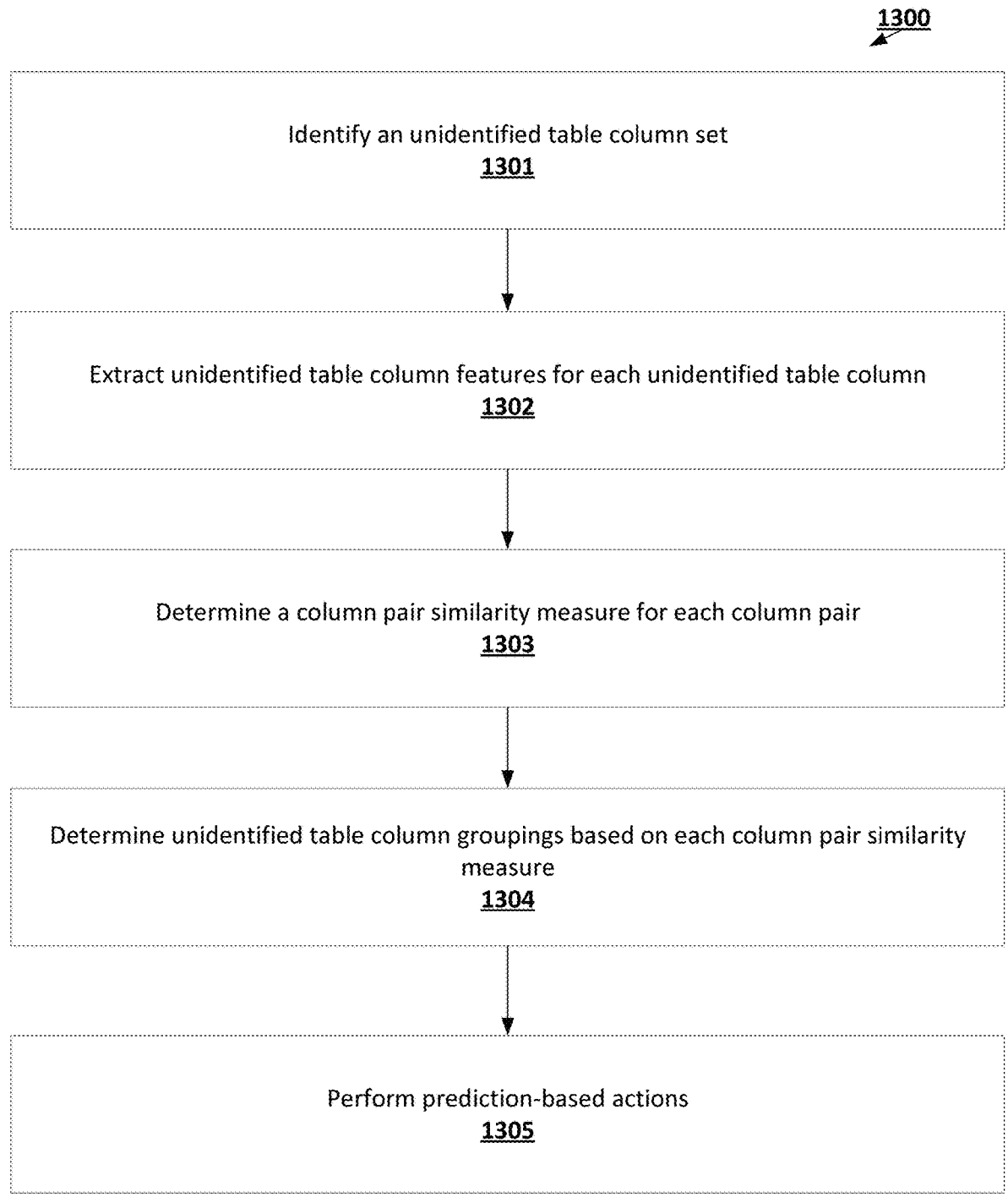

FIG. 13 is a flowchart diagram of an example process for generating an emergence report for a set of table data columns in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention introduce techniques for performing predictive structural analysis on structured cells in a manner that is configured to automate generating reliable schema metadata for the noted structured data cells. Inferring reliable structural metadata for a set of structured data cells reduces the need for users to browse such structured data cells in order to manually infer schema properties of those documents. By reducing the need for users to browse structured data cells in order to manually infer schema properties of those documents, various embodiments of the present invention reduce the computational resources needed to support such user actions, thus reducing overall computational load on server systems that are configured to support user interactions with those structural data cells, improving computational reliability of the noted server systems, and improving computational efficiency of the noted server systems.

An exemplary application of various embodiments of the present invention relates to provider roster standardization. Aspects of the provider roster standardization concepts relate to the problem of maintaining up-to-date health plan provider directories. Maintaining up-to-date health plan provider directories is a critical, complex, and costly task facing organizations across the health care system. Federal and state laws require that health plans maintain directories containing basic information about physicians and other health care providers. Industry estimates indicate that around $2.1 billion is spent annually across the health system on acquiring and maintaining provider data. One challenge that complicates the task of maintaining up-to-date health plan provider directories relates to the fact that provider groups add, change, and update their information regularly. Significant manual work is required to standardize each roster before they can be updated in the internal it system. This in turn leads to the below technical challenges: inconsistent column header names (e.g., highly varying representation limits the ability to build rule-based approaches since it will be costly to develop and hard to maintain); that column headers are merged and split (e.g., merged vs. split column headers makes it difficult to draw the boundary for functional columns that are represented by a combination of related columns); varied presentation of data, such as in rows vs. in columns (e.g., understanding data represented in a row vs. in a column requires cognitive abilities, specifically when dealing with large sets of varying columns in a provider roster); that some values must be derived or inferred (e.g., the ability to corollate values from multiple columns to infer a value requires multiple capabilities, including capabilities to identify columns, identify columns that are interrelated, and to correlate interrelated column values); and that the column representation changes or new columns continue to get added (e.g., the ability to detect variations and identify emergence of new columns are key for this capability).

To overcome the above-noted technical challenges, aspects of the provider roster standardization concepts utilize machine learning models to fix and standardize provider rosters so that they can be easily and cost-effectively updated in the internal IT system. The proposed machine learning models automatically identify new columns based at least in part on similar undetected columns from multiple rosters. Currently, machine learning is not being used to confront challenges in provider roster standardization. The proposed machine learning models can identify columns using natural language processing (NLP), pattern matching, and classification models; identify related columns using a clustering algorithm; infer context of a column based at least in part on other related columns that are in proximity to the target column; create functional group columns based at least in part on related columns in a cluster; highlight structural variances of a current roster vis-à-vis historical rosters of the same provider group; and detect new patterns emerging across provider groups to capture new attributes being used.

Various embodiments of the present invention include column type identification, such as: training two random forest classifier models, one to identify columns based at least in part on column headers and one to identify columns based at least in part on column values; using a NLP-based named entity recognition (NER) model to identify columns related to organization names, organization locations, and/or the like; using a custom-built pattern matching model to identify National Provider Identifier (NPI) records, provider group numbers, and/or the like; processing each column of a roster by the four models to identify a column name; and using a voting engine to compute a final column identification prediction based at least in part on column names predicted by each model, prediction confidence scores, provider group weights for each model, roster type weights for each model, and model weights for a predicted column.

Various embodiments of the present invention enable functional group and column context identification, such as using extracting the following column attributes for each column from one or more test rosters: column data types, column data patterns, most present entity types in columns, position indicators of columns from left, sparsity measures for column values of columns, and adjacent column names for columns; using a mean-shift clustering model to create clusters of related columns based at least in part on the extracted attributes; for each new roster, extracting the column attributes discussed above; providing the features extracted to the model to identify related columns; and refining column predictions based at least in part on proximity of a column to known column clusters.

Various embodiments of the present invention enable structural variance identification, such as using extracting the following column attributes for each column from a reference roster: data types, data patterns, most present entity types, position indicators from left, sparsity measures for column values, and adjacent column names for each column; predicting the extracted list of column attributes for roster column values; applying a similarity determination model for each column attribute between the reference roster and the live roster; using the output of the similarity determination model to detect if any column shows higher variance than a tolerance score in order to find potentially incorrect predictions; and producing variance reports for the roster columns.

Various embodiments of the present invention enable automatic detection of the emerging of new column types, such as using periodically analyzing all rosters for each provider group to extract a list of claims that are not predicted; extracting the following column attributes for each column: data types, data patterns, most present entity types, position indicators from left, sparsity measures for column values, and adjacent column names for each column; applying a similarity determination model for each column based at least in part on the extracted attributes detected to identify common columns; identifying emergence of new columns based at least in part on the common columns; and generating a report about emergence of new columns.

II. Definitions

The term "table data object" may refer to a data entity that is configured to describe a collection of inferred table columns, where the collection of inferred cell columns are determined by processing a collection of structured data cells, and where the collection of structured data cells comprise a group of header data cells and a group of value data cells. For example, the table data object may describe a collection of inferred cell columns that are determined by analyzing a collection of structured data cells described using a spreadsheet file, such as using a Microsoft Excel spreadsheet file. In an exemplary embodiments, a spreadsheet file may describe data associated with a provide roster used to report data associated with medical/healthcare providers to a health insurance provider. The spreadsheet file may then be analyzed to infer a group of inferred cell columns, which may for example be the columns defined by the spreadsheet file.

The term "table column" may refer to a data entity that is configured to describe an inferred cell column that is in turn described by a corresponding table data object. In some embodiments, the table data object describes, for a corresponding inferred cell column: (i) a table column value set that is determined based at least in part on a subset of the structured data cells in the inferred cell column that are deemed to be non-header cells and describe the content data associated with the inferred cell column, and (ii) a table column name set that is determined based at least in part on a subset of the structured data cells in the inferred cell column that are deemed to be header cells of the structured data cells. For example, in some embodiments, to determine a table column, a predictive data analysis computing entity may perform the following operations: (i) identifying an inferred cell column of a collection of structured data cells as a subset of the collection of structured data cells that are deemed to belong to a common column, (ii) identifying structural metadata associated with the collection of structured data cells that describes which defined rows of the collection are deemed to be header rows, (iii) determining that each structured data cell in the inferred cell column is part of the table column value set if the structured data cell belongs to a non-header row, and (iv) determining that each structured data cell in the inferred cell column is part of the table column name set if the structured data cell belongs to a header row. Accordingly, a table column value set may describe a set of values associated with structured data cells in an inferred cell column that belong to a non-header row, while a table column name set may describe a set of values associated with structured data cells in the inferred cell column that do not belong to a header row.

The term "candidate column type" may refer to a data entity that is configured to describe a type of data column that is expected to appear in a table data objects given a table type identifier (e.g., a roster type identifier) of the table data object. For example, when a table data object is associated with a provider data roster table type identifier, then the table data object may be expected to include a set of candidate column types including at least one of a provider name, a provider identifier, a provider address, a provider phone number, and/or the like. In some embodiments, the set of candidate column types associated with a table data object is determined based at least in part on at least one of a table type identifier associated with a table data object and a provider type identifier associated with a provider identifier for the table data object, such as a provider type identifier (e.g., a heart surgeon provider type identifier) that describes a type of providers associated with a provider roster table data object.

The term "header-based table classification machine learning model" may refer to a data entity that is configured to describe parameters, hyper-parameters, and/or defined operations of a machine learning model that is configured to perform one or more decision-tree-based predictive inferences based at least in part on the table column name set for a table column. For example, in some embodiments, the header-based table classification machine learning model is configured to process the table column value set for a table column to generate at least one of the following: (i) a predicted header-based column type for the table column, and (ii) a header-based column type voting weight value for the predicted header-based column type. An example of a header-based table classification machine learning model is a random forest classifier machine learning model that is configured to process the table column value set for a table column in order to generate one or more predictive inference outputs with respect to the table column. For example, the tree data objects characterizing a header-based table classification machine learning model that is a random forest classification machine learning model may be configured to perform a set of tree-based decision-making operations based at least in part on occurrence of particular terms in the table column name set for a table column and/or based at least in part on a count of occurrence of particular terms in the table column set. In some embodiments, a header-based table classification machine learning model that is a random forest classification machine learning model may be configured to generate header-based column type voting weight values based at least in part on how many predictive data analysis operations corresponding to the tree data objects characterizing the random forest machine learning model generate a particular predicted header-based column type for a particular table column. In some embodiments, inputs to a header-based table classification machine learning model include a table column name set which may be a vector or a text array. In some embodiments, outputs of a header-based table classification machine learning model may include: (i) a predicted header-based column type that may be a scalar value, and (ii) a header-based column type voting weight value that may be a scalar value or a vector.

The term "predicted header-based column type" may refer to a data entity that is configured to describe an inferred column type for a table column that is generated by a header-based table classification machine learning model via processing the table column name set for the table column. For example, when the header-based table classification machine learning model is a random forest classification machine learning model that is characterized by a group of decision tree data objects, the predictive data analysis computing entity may be configured to: (i) process the table column name set for the table column using the group of decision tree data objects to generate a candidate inferred column type for the table column using each of the decision tree data objects, and (ii) adopt the candidate inferred column type that has been selected by a highest number of decision tree data objects as the inferred column type. As another example, when the header-based table classification machine learning model is a random forest classification machine learning model that is characterized by a group of decision tree data objects each associated with a tree weight score value, the predictive data analysis computing entity may be configured: (i) process the table column name set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, and (iii) adopt the candidate inferred column type that has the highest aggregate weight score value as the inferred column type for the table column.

The term "header-based column type voting weight value" may refer to a data entity that is configured to describe an inferred credibility score for a corresponding predicted header-based column type for a table column. In some embodiments, the header-based column type voting weight value is determined based at least in part on the decision tree data objects that have selected the header-based column type voting weight value. For example, when the header-based table classification machine learning model is a random forest classification machine learning model that is characterized by a group of decision tree data objects, the predictive data analysis computing entity may be configured to: (i) process the table column name set for the table column using the group of decision tree data objects to generate a candidate inferred column type for the table column using each of the decision tree data objects, (ii) adopt the candidate inferred column type that has been selected by a highest number of decision tree data objects as the inferred column type, and (iii) determine the header-based column type voting weight value based at least in part on the count of number of decision tree data objects that have selected the inferred column type. As another example, when the header-based table classification machine learning model is a random forest classification machine learning model that is characterized by a group of decision tree data objects each associated with a tree weight score value, the predictive data analysis computing entity may be configured: (i) process the table column name set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, (iii) adopt the candidate inferred column type that has the highest aggregate weight score value as the inferred column type for the table column, and (iv) determine the header-based column type voting weight value based at least in part on the aggregate weight score weight value of the inferred column type. In some embodiments, the header-based column type voting weight value is adjusted based at least in part on at least one of the following: (i) a model weight contribution value that describes an expected/observed predictive correlation between the header-based table classification machine learning model used to generate the corresponding predicted header-based column type and the corresponding predicted header-based column type, (ii) a provider type weight contribution weight value that describes an expected/observed predictive correlation between a provider type identifier for the table data object and the corresponding predicted header-based column type, and (iii) a table type weight contribution value that describes an expected/observed predictive correlation between a table type identifier (e.g., a roster type identifier) for the table data object and the corresponding predicted header-based column type.

The term "data-based table classification machine learning model" may refer to a data entity that is configured to describe parameters, hyper-parameters, and/or defined operations of a machine learning model that is configured to perform one or more decision-tree-based predictive inferences based at least in part on the table column name set for a table column. For example, in some embodiments, the data-based table classification machine learning model is configured to process the table column value set for a table column to generate at least one of the following: (i) a predicted data-based column type for the table column, and (ii) a data-based column type voting weight value for the predicted data-based column type. An example of a data-based table classification machine learning model is a random forest classifier machine learning model that is configured to process the table column value set for a table column in order to generate one or more predictive inference outputs with respect to the table column. For example, the tree data objects characterizing a data-based table classification machine learning model that is a random forest classification machine learning model may be configured to perform a set of tree-based decision-making operations based at least in part on occurrence of particular terms in the table column value set for a table column and/or based at least in part on a count of occurrence of particular terms in the table column value set. In some embodiments, a data-based table classification machine learning model that is a random forest classification machine learning model may be configured to generate a data-based column type voting weight values based at least in part on how many predictive data analysis operations corresponding to the tree data objects characterizing the random forest machine learning model generate a particular predicted data-based column type for a particular table column. In some embodiments, inputs to a data-based table classification machine learning model include a table column value set which may be a vector, a matrix, or a text array. In some embodiments, outputs of a data-based table classification machine learning model may include: (i) a predicted data-based column type that may be a scalar value, and (ii) a data-based column type voting weight value that may be a scalar value or a vector.

The term "predicted data-based column type" may refer to a data entity that is configured to describe an inferred column type for a table column that is generated by a data-based table classification machine learning model via processing the table column value set for the table column. For example, when the data-based table classification machine learning model is a random forest classification machine learning model that is characterized by a group of decision tree data objects, the predictive data analysis computing entity may be configured to: (i) process the table column value set for the table column using the group of decision tree data objects to generate a candidate inferred column type for the table column using each of the decision tree data objects, and (ii) adopt the candidate inferred column type that has been selected by a highest number of decision tree data objects as the inferred column type. As another example, when the data-based table classification machine learning model is a random forest classification machine learning model that is characterized by a group of decision tree data objects each associated with a tree weight score value, the predictive data analysis computing entity may be configured: (i) process the table column value set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, and (iii) adopt the candidate inferred column type that has the highest aggregate weight score value as the inferred column type for the table column.

The term "data-based column type voting weight value" may refer to a data entity that is configured to describe an inferred credibility score for a corresponding predicted data-based column type for a table column. In some embodiments, the data-based column type voting weight value is determined based at least in part on the decision tree data objects that have selected the data-based column type voting weight value. For example, when the data-based table classification machine learning model is a random forest classification machine learning model that is characterized by a group of decision tree data objects, the predictive data analysis computing entity may be configured to: (i) process the table column value set for the table column using the group of decision tree data objects to generate a candidate inferred column type for the table column using each of the decision tree data objects, (ii) adopt the candidate inferred column type that has been selected by a highest number of decision tree data objects as the inferred column type, and (iii) determine the data-based column type voting weight value based at least in part on the count of number of decision tree data objects that have selected the inferred column type. As another example, when the data-based table classification machine learning model is a random forest classification machine learning model that is characterized by a group of decision tree data objects each associated with a tree weight score value, the predictive data analysis computing entity may be configured: (i) process the table column value set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, (iii) adopt the candidate inferred column type that has the highest aggregate weight score value as the inferred column type for the table column, and (iv) determine the data-based column type voting weight value based at least in part on the aggregate weight score weight value of the inferred column type. In some embodiments, the data-based column type voting weight value is adjusted based at least in part on at least one of the following: (i) a model weight contribution value that describes an expected/observed predictive correlation between the data-based table classification machine learning model used to generate the corresponding predicted data-based column type and the corresponding predicted data-based column type, (ii) a provider type weight contribution weight value that describes an expected/observed predictive correlation between a provider type identifier for the table data object and the corresponding predicted data-based column type, and (iii) a table type weight contribution value that describes an expected/observed predictive correlation between a table type identifier (e.g., a roster type identifier) for the table data object and the corresponding predicted data-based column type.

The term "entity recognition classification machine learning model" may refer to a data entity that is configured to describe parameters, hyper-parameters, and/or defined operations of a machine learning model that is configured to process the table column value set for a table column in accordance with one or more natural language processing operations in order to generate one or more predictive inference outputs related to the table column. For example, the entity recognition classification machine learning model may be a natural language processing model that is configured to: (i) determine whether particular defined entities (e.g., cities, organization names, and/or the like) appear in the table column value set for a table column, and (ii) in response to determining that particular defined entities appear in the table column value set for a table column, determine a predicted entity-recognition-based column type based at least in part on the particular defined entities. In an exemplary embodiment, if the table column value set for a table column includes particular defined entities related to an address text such as city name entities, the entity recognition classification machine learning model may determine that the table column is an address-related table column. In another exemplary embodiment, if the table column value set for a table column includes city name entities but not street name entities, the entity recognition classification machine learning model may determine that the table column is a city name table column. In yet another exemplary embodiment, if the table column value set for a table column includes city name entities as well as street name entities, the entity recognition classification machine learning model may determine that the table column is a full address table column. In some embodiments, the entity recognition classification machine learning model may be associated with various defined entity collections each comprising one or more candidate entity types, where each defined entity collection is associated with a corresponding predicted column type as well as a corresponding predicted column type weight. In some embodiments, the entity recognition classification machine learning model may be configured to process a table column value set in the following manner: (i) determine which target defined entity collections occur in the table column value set for a table column, (ii) adopt the corresponding predicted column type for a target defined entity collection that has the highest predicted column type weight among the target defined entity collections as the predicted entity-recognition-based column type for the table column, and (iii) adopt the corresponding predicted column type weight for a target defined entity collection that has the highest predicted column type weight among the target defined entity collections as the predicted entity-recognition-based column type weight for the table column. In some embodiments, the entity recognition classification machine learning model may be configured to process a table column value set in the following manner: (i) determine which target defined entity collections occur in the table column value set for a table column, (ii) adopt the corresponding predicted column type for a target defined entity collection that has the highest occurrence rate in the table column value set among the target defined entity collections as the predicted entity-recognition-based column type for the table column, and (iii) adopt the corresponding predicted column type weight for a target defined entity collection that has the highest occurrence rate in the table column value set among the target defined entity collections as the predicted entity-recognition-based column type weight for the table column. In some embodiments, inputs to an entity-recognition-based table classification machine learning model include a table column value set which may be a vector, a matrix, or a text array. In some embodiments, outputs of an entity-recognition-based table classification machine learning model may include: (i) a predicted entity-recognition-based column type that may be a scalar value, and (ii) an entity-recognition-based column type voting weight that may be a scalar value or a vector.

The term "predicted entity-recognition-based column type" may refer to a data entity that is configured to describe an inferred column type for a table column that is generated by processing the table column value set for the table column using an entity recognition classification machine learning model. For example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, and (ii) adopt the corresponding predicted column type for a target defined entity collection that has the highest predicted column type weight among the target defined entity collections as the predicted entity-recognition-based column type for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes both $ET_1$ and $ET_2$, and further $PTW_1 > PTW_2$, then the predicted entity-recognition-based column type for the first table column is determined based at least in part on $PT_1$. As another example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, and (ii) adopt the corresponding predicted column type for a target defined entity collection that has the highest occurrence rate in the table column value set among the target defined entity collections as the predicted entity-recognition-based column type for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes five occurrences of $ET_1$ and ten occurrences of $ET_2$, then the predicted entity-recognition-based column type for the first table column is determined based at least in part on $PT_2$, since $5+10>5$.

The term "entity-recognition-based column type voting weight" may refer to a data entity that is configured to describe an inferred credibility score for a corresponding predicted entity-recognition-based column type for a table column. For example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, (ii) adopt the corresponding predicted column type for a target defined entity collection that has the highest predicted column type weight among the target defined entity collections as the predicted entity-recognition-based column type for the table column, and (iii) adopt the corresponding predicted column type weight for a target defined entity collection that has the highest predicted column type weight among the target defined entity collections as the predicted entity-recognition-based column type weight for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes both $ET_1$ and $ET_2$, and further $PTW_1 > PTW_2$, then the predicted entity-recognition-based column type for the first table column is determined based at least in part on $PT_1$, and the entity-recognition-based column type voting weight value is determined based at least in part on $PTW_1$. As another example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, (ii) adopt the corresponding predicted column type for a target defined entity collection that has the highest occurrence rate in the table column value set among the target defined entity collections as the predicted entity-recognition-based column type for the table column, and (iii) adopt the corresponding predicted column type weight for a target defined entity collection that has the highest occurrence rate in the table column value set among the target defined entity collections as the predicted entity-recognition-based column type weight for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes five occurrences of $ET_1$ and ten occurrences of $ET_2$, then the predicted entity-recognition-based column type for the first table column is determined based at least in part on $PT_2$, and the entity-recognition-based column type voting weight for $PT_2$ is determined based at least in part on $PTW_2$, since $5+10>5$. In some embodiments, the entity-recognition-based column type voting weight value is adjusted based at least in part on at least one of the following: (i) a model weight contribution value that describes an expected/observed predictive correlation between the entity-recognition-based table classification machine learning model used to generate the corresponding predicted entity-recognition-based column type and the corresponding predicted header-based column type, (ii) a provider type weight contribution weight value that describes an expected/observed predictive correlation between a provider type identifier for the table data object and the corresponding predicted entity-recognition-based column type, and (iii) a table type weight contribution value that describes an expected/observed predictive correlation between a table type identifier (e.g., a roster type identifier) for the table data object and the corresponding predicted entity-recognition-based column type.

The term "pattern matching classification machine learning model" may refer to a data entity that is configured to describe parameters, hyper-parameters, and/or defined operations of a machine learning model that is configured to process the table column name set for a table column in accordance with one or more pattern matching operations (e.g., one or more regular-expression-based pattern matching operations) in order to generate one or more predictive inference outputs related to the table column. For example, the pattern matching classification machine learning model may be a custom-built pattern matching model that is configured to: (i) determine whether particular defined character sequence patterns appear in the table column name set for a table column, and (ii) in response to determining that particular defined character sequence patterns appear in the table column name set for a table column, determine a predicted pattern-matching-based column type based at least in part on the particular defined character sequence defined patterns. In some embodiments, the pattern matching classification machine learning model may be associated with various defined character sequence patterns, where each defined character sequence pattern is associated with a corresponding predicted column type as well as a corresponding predicted column type weight. In some embodiments, the pattern matching classification machine learning model may be configured to process a table column name set in the following manner: (i) determine which target defined character sequence patterns occur in the table column name set for a table column, (ii) adopt the corresponding predicted column type for a target defined character sequence pattern that has the highest predicted column type weight among the target defined character sequence patterns as the predicted pattern-matching-based column type for the table column, and (iii) adopt the corresponding predicted column type weight for a target character sequence pattern that has the highest predicted column type weight among the target character sequence patterns as the predicted pattern-matching-based column type weight for the table column. In some embodiments, the pattern matching classification machine learning model may be configured to process a table column value set in the following manner: (i) determine which target defined character sequence patterns occur in the table column value set for a table column, (ii) adopt the corresponding predicted column type for a target defined character sequence pattern that has the highest occurrence rate in the table column value set among the target defined character sequence patterns as the predicted pattern-matching-based column type for the table column, and (iii) adopt the corresponding predicted column type weight for a target defined character sequence pattern that has the highest occurrence rate in the table column value set among the target defined character sequence patterns as the predicted pattern-matching-based column type weight for the table column. In some embodiments, inputs to a pattern-matching-based table classification machine learning model include a table column name set which may be a vector or a text array. In some embodiments, outputs of a pattern-matching-based table classification machine learning model may include: (i) a predicted pattern-matching-based column type that may be a scalar value, and (ii) a pattern-matching-based column type voting weight that may be a scalar value or a vector.

The term "predicted pattern-matching-based column type" may refer to a data entity that is configured to describe an inferred column type for a table column that is generated by processing the table column value set for the table column using a pattern matching classification machine learning model. For example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, and (ii) adopt the corresponding predicted column type for a target defined character sequence pattern that has the highest predicted column type weight among the target defined character sequence patterns as the predicted pattern-matching-based column type for the table column. As another example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, and (ii) adopt the corresponding predicted column type for a target defined character sequence pattern that has the highest occurrence rate in the table column value set among the target defined character sequence patterns as the predicted pattern-matching-based column type for the table column.

The term "pattern-matching-based column type voting weight" may refer to a data entity that is configured to describe an inferred credibility score for a corresponding predicted pattern-matching-based column type for a table column. For example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, (ii) adopt the corresponding predicted column type for a target defined character sequence pattern that has the highest predicted column type weight among the target defined character sequence patterns as the predicted pattern-matching-based column type for the table column, and (iii) adopt the corresponding predicted column type weight for a target defined character sequence pattern that has the highest predicted column type weight among the target defined character sequence patterns as the predicted pattern-matching-based column type weight for the table column. As another example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, (ii) adopt the corresponding predicted column type for a target defined character sequence pattern that has the highest occurrence rate in the table column value set among the target defined character sequence patterns as the predicted pattern-matching-based column type for the table column, and (iii) adopt the corresponding predicted column type weight for a target defined character sequence pattern that has the highest occurrence rate in the table column value set among the target defined character sequence patterns as the predicted pattern-matching-based column type weight for the table column. In some embodiments, the pattern-matching-based column type voting weight value is adjusted based at least in part on at least one of the following: (i) a model weight contribution value that describes an expected/observed predictive correlation between the pattern-matching-based table classification machine learning model used to generate the corresponding predicted pattern-matching-based column type and the corresponding predicted header-based column type, (ii) a provider type weight contribution weight value that describes an expected/observed predictive correlation between a provider type identifier for the table data object and the corresponding predicted pattern-matching-based column type, and (iii) a table type weight contribution value that describes an expected/observed predictive correlation between a table type identifier (e.g., a roster type identifier) for the table data object and the corresponding predicted pattern-matching-based column type.

The term "predicted column type set" may refer to a data entity that is configured to describe each predicted column type generated by a column type classification machine learning model that describes a corresponding candidate column type. For example, if the set of predicted column types include a predicted header-based column type that describes a candidate column type $CCT_1$, a predicted data-based column type that describes a candidate column type $CCT_2$, a predicted entity-recognition-based column type that describes no candidate column types (e.g., since no defined entity collections were found in the table column value set for the target table column), and a predicted pattern-matching-based column type that describes no candidate column types (e.g., since no defined character pattern sequences were found in the table column name set for the target table column), then the predicted column type set for $CCT_1$ includes the predicted header-based column type and the predicted column type set for $CCT_2$ includes the predicted data-based column type.

The term "column type voting weight set" may refer to a data entity that is configured to describe each column type voting weight for a predicted column type in the predicted column type set for the candidate column type. For example, if the set of predicted column types include a predicted header-based column type that describes a candidate column type $CCT_1$, a predicted data-based column type that describes a candidate column type $CCT_2$, a predicted entity-recognition-based column type that describes no candidate column types (e.g., since no defined entity collections were found in the table column value set for the target table column), and a predicted pattern-matching-based column type that describes no candidate column types (e.g., since no defined character pattern sequences were found in the table column name set for the target table column), then the column type voting weight set for $CCT_1$ includes the header-based column type voting weight value for the predicted header-based column type and the column type voting weight set for $CCT_2$ includes the data-based column type voting weight value for the predicted data-based column type.

The term "candidate column type voting weight" may refer to a data entity that is configured to describe a value that describes an aggregation of the column type voting weight values in the column type voting weight set for a corresponding candidate column type. For example, if column type voting weight set for a candidate column type includes a column type voting weight $CTW_1$ and a column type voting weight $CTW_2$, then the candidate column type voting value for the candidate column type may be determined based at least in part on $CTW_1 + CTW_2$.

The term "multi-dimensional clustering space" may refer to a data entity that is configured to describe a multi-dimensional space characterized by a group of table column features, where a group of table columns are mapped to the multi-dimensional clustering space by a defined set of table column features in a manner such that each dimension of the multi-dimensional clustering space is associated with a table column feature of the defined set of table column features. In some embodiments, the multi-dimensional clustering space defines a set of table column clusters that may be generated using a clustering machine learning model, such as a k-means clustering routine. In some embodiments, the defined set of table column features for a table column comprises at least one of a data type feature of the table column, a data pattern feature of the table column, a most frequent entity type feature of the table column, a sparsity feature of the table column, and an adjacent column name feature of the table column. In some embodiments, the predictive data analysis computing entity generates the multi-dimensional clustering space by: (i) identifying a set of prior table columns from a set of prior table data objects, and (ii) for each prior table column, extracting a set of defined table column features and mapping the prior table column to the multi-dimensional space based at least in part on the setoff defined table column features.

The term "table column clustering machine learning model" may refer to a data entity that is configured to describe a machine learning model that is configured to process a mapping of the target table column in the multi-dimensional clustering space and the set of table column clusters defined by the multi-dimensional clustering space to generate a related table column cluster set for the target table column. The table column clustering machine learning model may, for example, be configured to perform the following operations with respect to a target table column: (i) for each table column cluster defined by the multi-dimensional clustering space, determine a distance measure between the mapping of the target table column in the multi-dimensional clustering space and a point in the multi-dimensional clustering space that is associated with the table column cluster (e.g., a centroid point of the table column cluster in the multi-dimensional clustering space), and (ii) determine the related table column cluster set as a subset of the table column clusters defined by the multi-dimensional clustering space whose distance measures satisfy (e.g., are below) a distance measure threshold. In some embodiments, the inputs to the table column cluster machine learning model include a set of vectors associated with a set of mapped table columns, while outputs of the table clustering machine learning model include a set of table column clusters where each table column cluster may be a vector or a matrix.

The term "related table column cluster set" may refer to a data entity that is configured to describe a subset of table column clusters defined by a multi-dimensional clustering space that are deemed to be related to a corresponding table column. In some embodiments, to generate the related table column cluster for a table column, a table column clustering machine learning model may, for example, be configured to perform the following operations with respect to a target table column: (i) for each table column cluster defined by the multi-dimensional clustering space, determine a distance measure between the mapping of the target table column in the multi-dimensional clustering space and a point in the multi-dimensional clustering space that is associated with the table column cluster (e.g., a centroid point of the table column cluster in the multi-dimensional clustering space), and (ii) determine the related table column cluster set as a subset of the table column clusters defined by the multi-dimensional clustering space whose distance measures satisfy (e.g., are below) a distance measure threshold. In some embodiments, determining the related table column cluster set for a table column comprises mapping the table column to a multi-dimensional clustering space characterized by the plurality of table column features, wherein the multi-dimensional clustering space comprises a plurality of table column clusters; determining a plurality of cluster distance values for the table column with respect to the plurality of table column clusters, wherein the plurality of cluster distance values comprise a cluster distance value for each table column cluster of the plurality of table column clusters; and determining the related table column cluster set based at least in part on a subset of the plurality of table column clusters whose cluster distance values satisfies a cluster distance value threshold.

The term "functional grouping" may refer to a data entity that is configured to describe a set of table columns that have been mapped to a multi-dimensional clustering space, where the set of table columns have a common related table column cluster set. In some embodiments, determining the functional grouping for a table column comprises identifying a group of clustered table columns having the related table column cluster set; and determining the functional grouping based at least in part on the related table column cluster.

The term "table column similarity measure" may refer to a data entity that is configured to describe a measure of similarity of the table columns in a table column pair. An example of a table column similarity measure for a table column pair is a cosine similarity measure that is determined based at least in part on a vector representation of the table column features of the table column in the table column pair and a vector representation of the reference column features of the reference table column in the table column pair. In some embodiments, determining the table column pair similarity measure for a table column pair comprises generating a table column mapping for the table column in the table column pair in a multi-dimensional clustering space; generating a reference table column mapping for the reference table column in the table column pair in the multi-dimensional clustering space; and determining the table column pair similarity measure based at least in part on the table column mapping and the reference table column mapping.

The term "variance report" may refer to a data entity that is configured to describe each table column of a table data object that is not associated with a threshold-satisfying (e.g., a threshold-exceeding) table column pair similarity measure with respect to a reference table data object. For example, in some embodiments, to determine the variance report for a table data object with respect to a reference table data object, the predictive data analysis computing entity performs the following operations: (i) for each table column, determining each table column pair similarity measure for a table column pair that comprises the table column and determining a subset of those table column pair similarity measures that exceed a table column pair similarity measure threshold, (ii) if the subset of those table column pair similarity measures for a table column that exceed the table column pair similarity measure threshold is empty, adopting the table column as part of the data described by the variance report.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating a disease risk score based at least in part on at least one of patient genomic data, patient behavioral data, patient clinical data, and/or the like.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention provide methods, apparatus, systems, computing devices, computing entities, and/or the like for performing predictive structural analysis. Certain embodiments of the present invention utilize systems, methods, and computer program products that perform predictive structural analysis using at least one of table column classification machine learning models, table column clustering machine learning models, structural variance generation machine learning models, and emergence report generation machine learning models.

Various embodiments of the present invention introduce techniques for performing predictive structural analysis on structured cells in a manner that is configured to automate generating reliable schema metadata for the noted structured data cells. Inferring reliable structural metadata for a set of structured data cells reduces the need for users to browse such structured data cells in order to manually infer schema properties of those documents. By reducing the need for users to browse structured data cells in order to manually infer schema properties of those documents, various embodiments of the present invention reduce the computational resources needed to support such user actions, thus reducing overall computational load on server systems that are configured to support user interactions with those structural data cells, improving computational reliability of the noted server systems, and improving computational efficiency of the noted server systems.

Table Column Classification Machine Learning Models

FIG. 4 is a flowchart diagram of an example process 400 for table column identification for a table column in a table data object. Via the various steps/operations of the process 400, a predictive data analysis computing entity 106 can efficiently and reliably generate a table column prediction for a table column, where the table column prediction is determined based at least in part on features of the table column itself, features of other table columns in the table data object, and data describing expected structural properties of the table data object (e.g., data describing a plurality of candidate column types that the predictive data analysis computing entity 106 expects to detect in the table data object given a table type of the table data object).

The process 400 begins at step/operation 401 when the predictive data analysis computing entity 106 identifies the table data object. In some embodiments, the predictive data analysis computing entity 106 receives the table data object from a client computing entity 102. In some embodiments, the predictive data analysis computing entity 106 retrieves the table data object from the storage subsystem 108 of the predictive data analysis system 101.

The table data object may describe a collection of inferred table columns, where the collection of inferred cell columns are determined by processing a collection of structured data cells, and where the collection of structured data cells comprise a group of header data cells and a group of value data cells. For example, the table data object may describe a collection of inferred cell columns that are determined by analyzing a collection of structured data cells described using a spreadsheet file, such as using a Microsoft Excel spreadsheet file. In an exemplary embodiments, a spreadsheet file may describe data associated with a provide roster used to report data associated with medical/healthcare providers to a health insurance provider. The spreadsheet file may then be analyzed to infer a group of inferred cell columns, which may for example be the columns defined by the spreadsheet file.

An operational example of a collection of structured data cells is depicted in FIG. 5. As depicted in FIG. 5, the collection of structured data cells include a set of header data cells 501 and a set of value data sets 502. As further depicted in FIG. 5, the collection of structured data cells describes a set of table column value sets, where each table column value set is associated with at least one table column name set. For example, as depicted in FIG. 5, the table column value set 511 is associated with a table column name set that comprises the table column name "Original Credentialing Committee Date (mm/dd/yyyy)." As another example, as further depicted in FIG. 5, the table column value set 512 is associated with a table column name set that comprises at least one of the table column name "Last Name" and the table column name "Provider's Identifying Information."

Returning to FIG. 4, at step/operation 402, the predictive data analysis computing entity 106 identifies a target table column of the table data object. Although the process 400 is described with respect to a single table column of the table data object, a person of ordinary skill in the relevant technology will recognize that the process 400 may be repeated for each table column of a plurality of table columns of the table data object.

A table column may describe an inferred cell column that is in turn described by a corresponding table data object. In some embodiments, the table data object describes, for a corresponding inferred cell column: (i) a table column value set that is determined based at least in part on a subset of the structured data cells in the inferred cell column that are deemed to be non-header cells and describe the content data associated with the inferred cell column, and (ii) a table column name set that is determined based at least in part on a subset of the structured data cells in the inferred cell column that are deemed to be header cells of the structured data cells. For example, in some embodiments, to determine a table column, the predictive data analysis computing entity 106 may perform the following operations: (i) identifying an inferred cell column of a collection of structured data cells as a subset of the collection of structured data cells that are deemed to belong to a common column, (ii) identifying structural metadata associated with the collection of structured data cells that describes which defined rows of the collection are deemed to be header rows, (iii) determining that each structured data cell in the inferred cell column is part of the table column value set if the structured data cell belongs to a non-header row, and (iv) determining that each structured data cell in the inferred cell column is part of the table column name set if the structured data cell belongs to a header row. Accordingly, a table column value set may describe a set of values associated with structured data cells in an inferred cell column that belong to a non-header row, while a table column name set may describe a set of values associated with structured data cells in the inferred cell column that do not belong to a header row.

For example, in accordance with the collection of structured data cells depicted in FIG. 5, for the inferred cell column 521, the predictive data analysis computing entity 106 may determine the table column value set 511 and a table column name set that comprises the table column name "Original Credentialing Committee Date (mm/dd/yyyy)."

Returning to FIG. 4, at step/operation 403, the predictive data analysis computing entity 106 generates, using a header-based table classification machine learning model and based at least in part on the table column name set for the target table column: (i) a predicted header-based column type for the target table column, and (ii) a header-based column type voting weight value for the predicted header-based column type. In some embodiments, the header-based table classification machine learning model is configured to process the table column name set for the target table column to generate at least one of the following: (i) a predicted header-based column type for the target table column, and (ii) a header-based column type voting weight value for the predicted header-based column type.

The header-based table classification machine learning model may be a machine learning model that is configured to perform one or more decision-tree-based predictive inferences based at least in part on the table column name set for a table column. For example, in some embodiments, the header-based table classification machine learning model is configured to process the table column name set for a table column to generate at least one of the following: (i) a predicted header-based column type for the table column, and (ii) a header-based column type voting weight value for the predicted header-based column type. An example of a header-based table classification machine learning model is a random forest classifier machine learning model that is configured to process the table column name set for a table column in order to generate one or more predictive inference outputs with respect to the table column. For example, the tree data objects characterizing a header-based table classification machine learning model that is a random forest classification machine learning model may be configured to perform a set of tree-based decision-making operations based at least in part on occurrence of particular terms in the table column name set for a table column and/or based at least in part on a count of occurrence of particular terms in the table column name set. In some embodiments, a header-based table classification machine learning model that is a random forest classification machine learning model may be configured to generate a header-based column type voting weight values based at least in part on how many predictive data analysis operations corresponding to the tree data objects characterizing the random forest machine learning model generate a particular predicted header-based column type for a particular table column.

A predicted header-based column type may describe an inferred column type for a table column that is generated by a header-based table classification machine learning model via processing the table column name set for the table column. For example, when the header-based table classification machine learning model is a random forest classification machine learning model that is characterized by a group of decision tree data objects, the predictive data analysis computing entity may be configured to: (i) process the table column name set for the table column using the group of decision tree data objects to generate a candidate inferred column type for the table column using each of the decision tree data objects, and (ii) adopt the candidate inferred column type that has been selected by a highest number of decision tree data objects as the inferred column type. As another example, when the header-based table classification machine learning model is a random forest classification machine learning model that is characterized by a group of decision tree data objects each associated with a tree weight score value, the predictive data analysis computing entity may be configured: (i) process the table column name set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, and (iii) adopt the candidate inferred column type that has the highest aggregate weight score value as the inferred column type for the table column.

A header-based column type voting weight value may describe an inferred credibility score for a corresponding predicted header-based column type for a table column. In some embodiments, the header-based column type voting weight value is determined based at least in part on the decision tree data objects that have selected the header-based column type voting weight value. For example, when the header-based table classification machine learning model is a random forest classification machine learning model that is characterized by a group of decision tree data objects, the predictive data analysis computing entity may be configured to: (i) process the table column name set for the table column using the group of decision tree data objects to generate a candidate inferred column type for the table column using each of the decision tree data objects, (ii) adopt the candidate inferred column type that has been selected by a highest number of decision tree data objects as the inferred column type, and (iii) determine the header-based column type voting weight value based at least in part on the count of number of decision tree data objects that have selected the inferred column type. As another example, when the header-based table classification machine learning model is a random forest classification machine learning model that is characterized by a group of decision tree data objects each associated with a tree weight score value, the predictive data analysis computing entity may be configured: (i) process the table column name set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, (iii) adopt the candidate inferred column type that has the highest aggregate weight score value as the inferred column type for the table column, and (iv) determine the header-based column type voting weight value based at least in part on the aggregate weight score weight value of the inferred column type.

In some embodiments, the header-based column type voting weight value is adjusted based at least in part on at least one of the following: (i) a model weight contribution value that describes an expected/observed predictive correlation between the header-based table classification machine learning model used to generate the corresponding predicted header-based column type and the corresponding predicted header-based column type, (ii) a provider type weight contribution weight value that describes an expected/observed predictive correlation between a provider type identifier for the table data object and the corresponding predicted header-based column type, and (iii) a table type weight contribution value that describes an expected/observed predictive correlation between a table type identifier (e.g., a roster type identifier) for the table data object and the corresponding predicted header-based column type. In some embodiments, determining a column type voting weight for a predicted column type comprises determining the column type voting weight based at least in part on a confidence score generated by a classification machine learning model of the plurality of classification machine learning models that is associated with the predicted column type.

At step/operation 404, the predictive data analysis computing entity 106 generates, using a data-based table classification machine learning model and based at least in part on the table column value set for the target table column: (i) a predicted data-based column type for the target table column, and (ii) a data-based column type voting weight value for the predicted data-based column type. In some embodiments, the data-based table classification machine learning model is configured to process the table column name set for the target table column to generate at least one of the following: (i) a predicted data-based column type for the target table column, and (ii) a data-based column type voting weight value for the predicted data-based column type.

The data-based table classification machine learning model may be a machine learning model that is configured to perform one or more decision-tree-based predictive inferences based at least in part on the table column name set for a table column. For example, in some embodiments, the data-based table classification machine learning model is configured to process the table column name set for a table column to generate at least one of the following: (i) a predicted data-based column type for the table column, and (ii) a data-based column type voting weight value for the predicted data-based column type. An example of a data-based table classification machine learning model is a random forest classifier machine learning model that is configured to process the table column name set for a table column in order to generate one or more predictive inference outputs with respect to the table column. For example, the tree data objects characterizing a data-based table classification machine learning model that is a random forest classification machine learning model may be configured to perform a set of tree-based decision-making operations based at least in part on occurrence of particular terms in the table column value set for a table column and/or based at least in part on a count of occurrence of particular terms in the table column value set. In some embodiments, a data-based table classification machine learning model that is a random forest classification machine learning model may be configured to generate a data-based column type voting weight values based at least in part on how many predictive data analysis operations corresponding to the tree data objects characterizing the random forest machine learning model generate a particular predicted data-based column type for a particular table column.

A predicted data-based column type may describe an inferred column type for a table column that is generated by a data-based table classification machine learning model via processing the table column value set for the table column. For example, when the data-based table classification machine learning model is a random forest classification machine learning model that is characterized by a group of decision tree data objects, the predictive data analysis computing entity may be configured to: (i) process the table column value set for the table column using the group of decision tree data objects to generate a candidate inferred column type for the table column using each of the decision tree data objects, and (ii) adopt the candidate inferred column type that has been selected by a highest number of decision tree data objects as the inferred column type. As another example, when the data-based table classification machine learning model is a random forest classification machine learning model that is characterized by a group of decision tree data objects each associated with a tree weight score value, the predictive data analysis computing entity may be configured: (i) process the table column value set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, and (iii) adopt the candidate inferred column type that has the highest aggregate weight score value as the inferred column type for the table column.

A data-based column type voting weight value may describe an inferred credibility score for a corresponding predicted data-based column type for a table column. In some embodiments, the data-based column type voting weight value is determined based at least in part on the decision tree data objects that have selected the data-based column type voting weight value. For example, when the data-based table classification machine learning model is a random forest classification machine learning model that is characterized by a group of decision tree data objects, the predictive data analysis computing entity may be configured to: (i) process the table column value set for the table column using the group of decision tree data objects to generate a candidate inferred column type for the table column using each of the decision tree data objects, (ii) adopt the candidate inferred column type that has been selected by a highest number of decision tree data objects as the inferred column type, and (iii) determine the data-based column type voting weight value based at least in part on the count of number of decision tree data objects that have selected the inferred column type. As another example, when the data-based table classification machine learning model is a random forest classification machine learning model that is characterized by a group of decision tree data objects each associated with a tree weight score value, the predictive data analysis computing entity may be configured: (i) process the table column value set for the table column using the group of decision tree data objects to generate a candidate inferred column type for the table column using each of the decision tree data objects, (ii) generate an aggregate weight score value for each candidate inferred column type based at least in part on the tree weight score values of the decision tree data objects that have selected the candidate inferred column type, (iii) adopt the candidate inferred column type that has the highest aggregate weight score value as the inferred column type for the table column, and (iv) determine the data-based column type voting weight value based at least in part on the aggregate weight score weight value of the inferred column type.

In some embodiments, the data-based column type voting weight value is adjusted based at least in part on at least one of the following: (i) a model weight contribution value that describes an expected/observed predictive correlation between the data-based table classification machine learning model used to generate the corresponding predicted data-based column type and the corresponding predicted header-based column type, (ii) a provider type weight contribution weight value that describes an expected/observed predictive correlation between a provider type identifier for the table data object and the corresponding predicted data-based column type, and (iii) a table type weight contribution value that describes an expected/observed predictive correlation between a table type identifier (e.g., a roster type identifier) for the table data object and the corresponding predicted data-based column type. In some embodiments, determining a column type voting weight for a predicted column type comprises determining the column type voting weight based at least in part on a confidence score generated by a classification machine learning model of the plurality of classification machine learning models that is associated with the predicted column type.

At step/operation 405, the predictive data analysis computing entity 106 generates, using an entity recognition classification machine learning model and based at least in part on the table column value set for the target table column: (i) a predicted entity-recognition-based column type for the target table column, and (ii) an entity-recognition-based column type voting weight value for the target table column. In some embodiments, the entity recognition classification machine learning model is configured to process the table column value set for the target table column to generate at least one of the following: (i) a predicted entity-recognition-based column type for the target table column, and (ii) an entity-recognition-based column type voting weight value for the target table column.

An entity recognition classification machine learning model may be a machine learning model that is configured to process the table column value set for a table column in accordance with one or more natural language processing operations in order to generate one or more predictive inference outputs related to the table column. For example, the entity recognition classification machine learning model may be a natural language processing model that is configured to: (i) determine whether particular defined entities (e.g., cities, organization names, and/or the like) appear in the table column value set for a table column, and (ii) in response to determining that particular defined entities appear in the table column value set for a table column, determine a predicted entity-recognition-based column type based at least in part on the particular defined entities. In an exemplary embodiment, if the table column value set for a table column includes particular defined entities related to an address text such as city name entities, the entity recognition classification machine learning model may determine that the table column is an address-related table column. In another exemplary embodiment, if the table column value set for a table column includes city name entities but not street name entities, the entity recognition classification machine learning model may determine that the table column is a city name table column. In yet another exemplary embodiment, if the table column value set for a table column includes city name entities as well as street name entities, the entity recognition classification machine learning model may determine that the table column is a full address table column.

In some embodiments, the entity recognition classification machine learning model may be associated with various defined entity collections each comprising one or more candidate entity types, where each defined entity collection is associated with a corresponding predicted column type as well as a corresponding predicted column type weight. In some embodiments, the entity recognition classification machine learning model may be configured to process a table column value set in the following manner: (i) determine which target defined entity collections occur in the table column value set for a table column, (ii) adopt the corresponding predicted column type for a target defined entity collection that has the highest predicted column type weight among the target defined entity collections as the predicted entity-recognition-based column type for the table column, and (iii) adopt the corresponding predicted column type weight for a target defined entity collection that has the highest predicted column type weight among the target defined entity collections as the predicted entity-recognition-based column type weight for the table column. In some embodiments, the entity recognition classification machine learning model may be configured to process a table column value set in the following manner: (i) determine which target defined entity collections occur in the table column value set for a table column, (ii) adopt the corresponding predicted column type for a target defined entity collection that has the highest occurrence rate in the table column value set among the target defined entity collections as the predicted entity-recognition-based column type for the table column, and (iii) adopt the corresponding predicted column type weight for a target defined entity collection that has the highest occurrence rate in the table column value set among the target defined entity collections as the predicted entity-recognition-based column type weight for the table column.

A predicted entity-recognition-based column type may describe an inferred column type for a table column that is generated by processing the table column value set for the table column using an entity recognition classification machine learning model. For example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, and (ii) adopt the corresponding predicted column type for a target defined entity collection that has the highest predicted column type weight among the target defined entity collections as the predicted entity-recognition-based column type for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes both $ET_1$ and $ET_2$, and further $PTW_1 > PTW_2$, then the predicted entity-recognition-based column type for the first table column is determined based at least in part on $PT_1$.

As another example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, and (ii) adopt the corresponding predicted column type for a target defined entity collection that has the highest occurrence rate in the table column value set among the target defined entity collections as the predicted entity-recognition-based column type for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes five occurrences of $ET_1$ and ten occurrences of $ET_2$, then the predicted entity-recognition-based column type for the first table column is determined based at least in part on $PT_2$, since 5+10>5.

An entity-recognition-based column type voting weight may describe an inferred credibility score for a corresponding predicted entity-recognition-based column type for a table column. For example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, (ii) adopt the corresponding predicted column type for a target defined entity collection that has the highest predicted column type weight among the target defined entity collections as the predicted entity-recognition-based column type for the table column, and (iii) adopt the corresponding predicted column type weight for a target defined entity collection that has the highest predicted column type weight among the target defined entity collections as the predicted entity-recognition-based column type weight for the table column.

In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes both $ET_1$ and $ET_2$, and further $PTW_1 > PTW_2$, then the predicted entity-recognition-based column type for the first table column is determined based at least in part on $PT_1$, and the entity-recognition-based column type voting weight value is determined based at least in part on $PTW_1$.

As another example, when the entity recognition machine learning model is a natural language processing machine learning model that is characterized by various defined entity collections, the entity recognition classification machine learning model may be configured to process a table column value set in the following manner: (i) determine which target defined entity collections occur in the table column value set for a table column, (ii) adopt the corresponding predicted column type for a target defined entity collection that has the highest occurrence rate in the table column value set among the target defined entity collections as the predicted entity-recognition-based column type for the table column, and (iii) adopt the corresponding predicted column type weight for a target defined entity collection that has the highest occurrence rate in the table column value set among the target defined entity collections as the predicted entity-recognition-based column type weight for the table column. In an exemplary embodiment, if the entity recognition machine learning model is associated with a first defined entity collection characterized by $\{ET_1, ET_2\}$ that is associated with the predicted column type $PT_1$ and the predicted column type weight $PTW_1$ and a second defined entity type collection characterized by $\{ET_2\}$ that is associated with the predicted column type $PT_2$ and the predicted column type weight $PTW_2$ (where each $ET_n$ is an entity type such as a city name entity type), and further if a first table column includes five occurrences of $ET_1$ and ten occurrences of $ET_2$, then the predicted entity-recognition-based column type for the first table column is determined based at least in part on $PT_2$, and the entity-recognition-based column type voting weight for $PT_2$ is determined based at least in part on $PTW_2$, since 5+10>5.

In some embodiments, the entity-recognition-based column type voting weight value is adjusted based at least in part on at least one of the following: (i) a model weight contribution value that describes an expected/observed predictive correlation between the entity-recognition-based table classification machine learning model used to generate the corresponding predicted entity-recognition-based column type and the corresponding predicted header-based column type, (ii) a provider type weight contribution weight value that describes an expected/observed predictive correlation between a provider type identifier for the table data object and the corresponding predicted entity-recognition-based column type, and (iii) a table type weight contribution value that describes an expected/observed predictive correlation between a table type identifier (e.g., a roster type identifier) for the table data object and the corresponding predicted entity-recognition-based column type. In some embodiments, determining a column type voting weight for a predicted column type comprises determining the column type voting weight based at least in part on a confidence score generated by a classification machine learning model of the plurality of classification machine learning models that is associated with the predicted column type.

At step/operation 406, the predictive data analysis computing entity 106 generates, using a pattern machine classification machine learning model and based at least in part on the table column name set for the target table column: (i) a predicted pattern-matching-based column type for the target table column type, and (ii) a pattern-matching-based column type voting weight value for the predicted pattern-matching-based column type. In some embodiments, the pattern matching classification machine learning model is configured to process the table column name set for the target table column to generate at least one of the following: (i) a predicted pattern-matching-based column type for the target table column, and (ii) a pattern-matching-based column type voting weight value for the target table column.

A pattern matching classification machine learning model may be a machine learning model that is configured to process the table column name set for a table column in accordance with one or more pattern matching operations (e.g., one or more regular-expression-based pattern matching operations) in order to generate one or more predictive inference outputs related to the table column. For example, the pattern matching classification machine learning model may be a custom-built pattern matching model that is configured to: (i) determine whether particular defined character sequence patterns appear in the table column name set for a table column, and (ii) in response to determining that particular defined character sequence patterns appear in the table column name set for a table column, determine a predicted pattern-matching-based column type based at least in part on the particular defined character sequence defined patterns. In some embodiments, the pattern matching classification machine learning model may be associated with various defined character sequence patterns, where each defined character sequence pattern is associated with a corresponding predicted column type as well as a corresponding predicted column type weight.

In some embodiments, the pattern matching classification machine learning model may be configured to process a table column name set in the following manner: (i) determine which target defined character sequence patterns occur in the table column name set for a table column, (ii) adopt the corresponding predicted column type for a target defined character sequence pattern that has the highest predicted column type weight among the target defined character sequence patterns as the predicted pattern-matching-based column type for the table column, and (iii) adopt the corresponding predicted column type weight for a target character sequence pattern that has the highest predicted column type weight among the target character sequence patterns as the predicted pattern-matching-based column type weight for the table column. In some embodiments, the pattern matching classification machine learning model may be configured to process a table column value set in the following manner: (i) determine which target defined character sequence patterns occur in the table column value set for a table column, (ii) adopt the corresponding predicted column type for a target defined character sequence pattern that has the highest occurrence rate in the table column value set among the target defined character sequence patterns as the predicted pattern-matching-based column type for the table column, and (iii) adopt the corresponding predicted column type weight for a target defined character sequence pattern that has the highest occurrence rate in the table column value set among the target defined character sequence patterns as the predicted pattern-matching-based column type weight for the table column.

A predicted pattern-matching-based column type may describe an inferred column type for a table column that is generated by processing the table column value set for the table column using a pattern matching classification machine learning model. For example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, and (ii) adopt the corresponding predicted column type for a target defined character sequence pattern that has the highest predicted column type weight among the target defined character sequence patterns as the predicted pattern-matching-based column type for the table column. As another example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, and (ii) adopt the corresponding predicted column type for a target defined character sequence pattern that has the highest occurrence rate in the table column value set among the target defined character sequence patterns as the predicted pattern-matching-based column type for the table column.

A pattern-matching-based column type voting weight may describe an inferred credibility score for a corresponding predicted pattern-matching-based column type for a table column. For example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, (ii) adopt the corresponding predicted column type for a target defined character sequence pattern that has the highest predicted column type weight among the target defined character sequence patterns as the predicted pattern-matching-based column type for the table column, and (iii) adopt the corresponding predicted column type weight for a target defined character sequence pattern that has the highest predicted column type weight among the target defined character sequence patterns as the predicted pattern-matching-based column type weight for the table column.

As another example, when the pattern matching machine learning model is a natural language processing machine learning model that is characterized by various defined character sequence patterns, the pattern matching classification machine learning model may be configured to process a table column value set in the following manner: (i) determine which target defined character sequence patterns occur in the table column value set for a table column, (ii) adopt the corresponding predicted column type for a target defined character sequence pattern that has the highest occurrence rate in the table column value set among the target defined character sequence patterns as the predicted pattern-matching-based column type for the table column, and (iii) adopt the corresponding predicted column type weight for a target defined character sequence pattern that has the highest occurrence rate in the table column value set among the target defined character sequence patterns as the predicted pattern-matching-based column type weight for the table column.

In some embodiments, the pattern-matching-based column type voting weight value is adjusted based at least in part on at least one of the following: (i) a model weight contribution value that describes an expected/observed predictive correlation between the pattern-matching-based table classification machine learning model used to generate the corresponding predicted pattern-matching-based column type and the corresponding predicted header-based column type, (ii) a provider type weight contribution weight value that describes an expected/observed predictive correlation between a provider type identifier for the table data object and the corresponding predicted pattern-matching-based column type, and (iii) a table type weight contribution value that describes an expected/observed predictive correlation between a table type identifier (e.g., a roster type identifier) for the table data object and the corresponding predicted pattern-matching-based column type. In some embodiments, determining a column type voting weight for a predicted column type comprises determining the column type voting weight based at least in part on a confidence score generated by a classification machine learning model of the plurality of classification machine learning models that is associated with the predicted column type.

At step/operation 407, the predictive data analysis computing entity 106 generates, using a voting machine learning model and based at least in part on the predicted column types determined in steps/operation 403-406 and the column type voting weights determined in steps/operation 403-406, an overall column type prediction. In some embodiments, the voting machine learning model is configured to: (i) identify a group of candidate column types; (ii) for each candidate column type: (a) determine a predicted column type set of the predicted column types determined in steps/operation 403-406 that correspond to the candidate column type, (b) determine a column type voting weight set of the column type voting weights determined in steps/operation 403-406 that correspond to the predicted column type set for the candidate column type, and (c) generate a candidate column type voting value for the candidate column type by aggregating all the column type voting weights in the column type voting weight set for the candidate column type; and (iii) generate the overall column type prediction for a table column based at least in part on the candidate column type having the highest candidate column type voting value.

In some embodiments, step/operation 407 may be performed in accordance with the process that is depicted in FIG. 6. The process that is depicted in FIG. 6 begins at step/operation 601 when the predictive data analysis computing entity 106 identifies a group of candidate column types. A candidate column type may be a type of data columns that is expected to appear in a table data objects given a table type identifier (e.g., a roster type identifier) of the table data object. For example, when a table data object is associated with a provider data roster table type identifier, then the table data object may be expected to include a set of candidate column types including at least one of a provider name, a provider identifier, a provider address, a provider phone number, and/or the like. In some embodiments, the set of candidate column types associated with a table data object is determined based at least in part on at least one of a table type identifier associated with a table data object and a provider type identifier associated with a provider identifier for the table data object, such as a provider type identifier (e.g., a heart surgeon provider type identifier) that describes a type of providers associated with a provider roster table data object.

At step/operation 602, the predictive data analysis computing entity 106 identifies a set of predicted column types for the target table column. Examples of predicted column types include at least one of a predicted header-based column type, a predicted data-based column type, a predicted entity-recognition-based column type, and a predicted pattern-matching-based column type.

At step/operation 603, the predictive data analysis computing entity 106 determines, for each candidate column type, a predicted column type set of the set of predicted column types that correspond to the candidate column type. The predicted column type set may describe each predicted column type generated by a column type classification machine learning model that describes a corresponding candidate column type. For example, if the set of predicted column types include a predicted header-based column type that describes a candidate column type $CCT_1$, a predicted data-based column type that describes a candidate column type $CCT_2$, a predicted entity-recognition-based column type that describes no candidate column types (e.g., since no defined entity collections were found in the table column value set for the target table column), and a predicted pattern-matching-based column type that describes no candidate column types (e.g., since no defined character pattern sequences were found in the table column name set for the target table column), then the predicted column type set for $CCT_1$ includes the predicted header-based column type and the predicted column type set for $CCT_2$ includes the predicted data-based column type.

At step/operation 604, the predictive data analysis computing entity 106 determines, for each candidate column type, a column type voting weight set that describes each column type voting weight for a predicted column type in the predicted column type set for the candidate column type. The column type voting weight set for a candidate column type may describe each column type voting weight for a predicted column type in the predicted column type set for the candidate column type. For example, if the set of predicted column types include a predicted header-based column type that describes a candidate column type $CCT_1$, a predicted data-based column type that describes a candidate column type $CCT_2$, a predicted entity-recognition-based column type that describes no candidate column types (e.g., since no defined entity collections were found in the table column value set for the target table column), and a predicted pattern-matching-based column type that describes no candidate column types (e.g., since no defined character pattern sequences were found in the table column name set for the target table column), then the column type voting weight set for $CCT_1$ includes the header-based column type voting value for the predicted header-based column type and the column type voting weight set for $CCT_2$ includes the data-based column type voting value for the predicted data-based column type.

At step/operation 605, the predictive data analysis computing entity 106 generates, for each candidate column type, a candidate column type voting value based at least in part on each column type voting weight in the column type voting weight set for the candidate column type. The candidate column type voting weight may be a value that describes an aggregation of the column type voting weight values in the column type voting weight set for a corresponding candidate column type. For example, if column type voting weight set for a candidate column type includes a column type voting weight $CTW_1$ and a column type voting weight $CTW_2$, then the candidate column type voting value for the candidate column type may be determined based at least in part on $CTW_1+CTW_2$.

At step/operation 606, the predictive data analysis computing entity 106 generates the overall column type prediction based at least in part on each candidate column type voting value for a candidate column type with respect to the table column. In some embodiments, to generate the overall column type, the predictive data analysis computing entity 106 performs the following operation: (i) determining a maximal candidate column type voting value that is associated with the table column, (ii) determining whether the maximal candidate column type voting value satisfies (e.g., exceeds) a candidate column type voting value threshold, (iii) in response to determining that the maximal candidate column type voting value fails to satisfy the candidate column type voting value threshold, generating the overall column type prediction based at least in part on the candidate column type that is associated with the maximal candidate column type, and (iv) in response to determining that the maximal candidate column type voting value fails to satisfy the candidate column type voting value threshold, generating a null overall column type prediction for the table column (e.g., an overall column type prediction that describes that the target table column is not associated with any candidate table columns).

Returning to FIG. 4, at step/operation 408, the predictive data analysis computing entity 106 performs one or more prediction-based actions based at least in part on the overall column type prediction for the table column. In some embodiments, the predictive data analysis computing entity 106 generates user interface data for a prediction output user interface that describes, for each table column, the overall column type prediction for the table column. An operational example of such a prediction output user interface 700 is depicted in FIG. 7. As depicted in FIG. 7, the prediction output user interface describes that a first table column is associated with provider_first_name, a second table column is associated with provider_last_name, a third table column is associated with provider_full_address, and a fourth table column is not associated with any predicted candidate table column types.

By disclosing various table column classification machine learning models, various embodiments of the present invention introduce techniques for performing predictive structural analysis on structured cells in a manner that is configured to automate generating reliable schema metadata for the noted structured data cells. Inferring reliable structural metadata for a set of structured data cells reduces the need for users to browse such structured data cells in order to manually infer schema properties of those documents. By reducing the need for users to browse structured data cells in order to manually infer schema properties of those documents, various embodiments of the present invention reduce the computational resources needed to support such user actions, thus reducing computational load on server systems needed to support user interactions with those structural data cells, improving computational reliability of the noted server systems, and improving computational efficiency of the noted server systems.

Table Column Clustering Machine Learning Models

FIG. 8 is a flowchart diagram of an example process 800 for generating a functional grouping for a table column. Via the various steps/operations of the process 800, the predictive data analysis computing entity 106 can group together related columns as part of performing predictive structural analysis for a table data object.

The process 800 begins at step/operation 801 when the predictive data analysis computing entity 106 identifies the table data object. In some embodiments, the predictive data analysis computing entity 106 receives the table data object from a client computing entity 102. In some embodiments, the predictive data analysis computing entity 106 retrieves the table data object from the storage subsystem 108 of the predictive data analysis system 101. As described above, the table data object may describe a collection of inferred table columns, where the collection of inferred cell columns are determined by processing a collection of structured data cells, and where the collection of structured data cells comprise a group of header data cells and a group of value data cells. For example, the table data object may describe a collection of inferred cell columns that are determined by analyzing a collection of structured data cells described using a spreadsheet file, such as using a Microsoft Excel spreadsheet file. In an exemplary embodiments, a spreadsheet file may describe data associated with a provide roster used to report data associated with medical/healthcare providers to a health insurance provider. The spreadsheet file may then be analyzed to infer a group of inferred cell columns, which may for example be the columns defined by the spreadsheet file.

At step/operation 802, the predictive data analysis computing entity 106 identifies a target table column of the table data object. Although the process 800 is described with respect to a single table column of the table data object, a person of ordinary skill in the relevant technology will recognize that the process 800 may be repeated for each table column of a plurality of table columns of the table data object.

At step/operation 803, the predictive data analysis computing entity 106 identifies a multi-dimensional clustering space. The multi-dimensional clustering space may be a multi-dimensional space characterized by a group of table column features, where a group of table columns are mapped to the multi-dimensional clustering space by a defined set of table column features in a manner such that each dimension of the multi-dimensional clustering space is associated with a table column feature of the defined set of table column features. In some embodiments, the multi-dimensional clustering space defines a set of table column clusters that may be generated using a clustering machine learning model, such as a k-means clustering routine. In some embodiments, the defined set of table column features for a table column comprises at least one of a data type feature of the table column, a data pattern feature of the table column, a most frequent entity type feature of the table column, a sparsity feature of the table column, and an adjacent column name feature of the table column. In some embodiments, the predictive data analysis computing entity generates the multi-dimensional clustering space by: (i) identifying a set of prior table columns from a set of prior table data objects, and (ii) for each prior table column, extracting a set of defined table column features and mapping the prior table column to the multi-dimensional space based at least in part on the setoff defined table column features.

An operational example of a multi-dimensional clustering space 900 is depicted in FIG. 9. As depicted in FIG. 9, each point in the multi-dimensional clustering space 900 corresponds to a mapping for a table column based at least in part on a defined set of table column features, where the defined set of table column features are associated with the dimensions of the multi-dimensional clustering space 900 (e.g., a first table column feature is associated with a first dimension, a second table column feature is associated with a second dimension, and so on). As further depicted in FIG. 9, the multi-dimensional clustering space 900 defines a set of table column clusters, such as the table column cluster 901 and the table column cluster 902.

Returning to FIG. 8, at step/operation 804, the predictive data analysis computing entity 106 generates, using a table column clustering machine learning model, a related table column cluster set for the target table column. In some embodiments, to generate the related table column cluster set for the target table column, the predictive data analysis computing entity 106: (i) maps the target table column to a multi-dimensional clustering space, and (ii) determines the related table column cluster set based at least in part on the mapping of the target table column in the multi-dimensional clustering space and the set of table column clusters defined by the multi-dimensional clustering space. In some embodiments, mapping the target table column to a multi-dimensional clustering space comprises extracting a set of table column features associated with the multi-dimensional clustering space from the target table column, and mapping the target table column to the multi-dimensional space based at least in part on the set of table column features. In some embodiments, the defined set of table column features for the target table column comprises at least one of a data type feature of the target table column, a data pattern feature of the target table column, a most frequent entity type feature of the target table column, a sparsity feature of the target table column, and an adjacent column name feature of the target table column.

The table column clustering machine learning model may be a machine learning model that is configured to process a mapping of the target table column in the multi-dimensional clustering space and the set of table column clusters defined by the multi-dimensional clustering space to generate a related table column cluster set for the target table column. The table column clustering machine learning model may, for example, be configured to perform the following operations with respect to a target table column: (i) for each table column cluster defined by the multi-dimensional clustering space, determine a distance measure between the mapping of the target table column in the multi-dimensional clustering space and a point in the multi-dimensional clustering space that is associated with the table column cluster (e.g., a centroid point of the table column cluster in the multi-dimensional clustering space), and (ii) determine the related table column cluster set as a subset of the table column clusters defined by the multi-dimensional clustering space whose distance measures satisfy (e.g., are below) a distance measure threshold.

The related table column cluster set may describe a subset of table column clusters defined by a multi-dimensional clustering space that are deemed to be related to a corresponding table column. In some embodiments, to generate the related table column cluster for a table column, a table column clustering machine learning model may, for example, be configured to perform the following operations with respect to a target table column: (i) for each table column cluster defined by the multi-dimensional clustering space, determine a distance measure between the mapping of the target table column in the multi-dimensional clustering space and a point in the multi-dimensional clustering space that is associated with the table column cluster (e.g., a centroid point of the table column cluster in the multi-dimensional clustering space), and (ii) determine the related table column cluster set as a subset of the table column clusters defined by the multi-dimensional clustering space whose distance measures satisfy (e.g., are below) a distance measure threshold. In some embodiments, determining the related table column cluster set for a table column comprises mapping the table column to a multi-dimensional clustering space characterized by the plurality of table column features, wherein the multi-dimensional clustering space comprises a plurality of table column clusters; determining a plurality of cluster distance values for the table column with respect to the plurality of table column clusters, wherein the plurality of cluster distance values comprise a cluster distance value for each table column cluster of the plurality of table column clusters; and determining the related table column cluster set based at least in part on a subset of the plurality of table column clusters whose cluster distance values satisfies a cluster distance value threshold.

At step/operation 805, the predictive data analysis computing entity 106 generates a functional grouping for the target table column based at least in part on the related table column cluster set for the target table column. The functional grouping may describe a set of table columns that have been mapped to a multi-dimensional clustering space, where the set of table columns have a common related table column cluster set. In some embodiments, determining the functional grouping for a table column comprises identifying a group of clustered table columns having the related table column cluster set; and determining the functional grouping based at least in part on the related table column cluster.

At step/operation 806, the predictive data analysis computing entity 106 performs one or more prediction-based actions based at least in part on the functional grouping. In some embodiments, the predictive data analysis computing entity 106 generates user interface data for a prediction output user interface that describes, for each table column, the functional grouping for the table column. An operational example of such a prediction output user interface 1000 is depicted in FIG. 10. As depicted in FIG. 10, the prediction output user interface describes that a first table column is associated with a first functional grouping, a second table column is associated with the first functional grouping, a third table column is associated with a second functional grouping, and a fourth table column is not associated with any predicted candidate table column types.

By disclosing various table column clustering machine learning models, various embodiments of the present invention introduce techniques for performing predictive structural analysis on structured cells in a manner that is configured to automate generating reliable schema metadata for the noted structured data cells. Inferring reliable structural metadata for a set of structured data cells reduces the need for users to browse such structured data cells in order to manually infer schema properties of those documents. By reducing the need for users to browse structured data cells in order to manually infer schema properties of those documents, various embodiments of the present invention reduce the computational resources needed to support such user actions, thus reducing computational load on server systems needed to support user interactions with those structural data cells, improving computational reliability of the noted server systems, and improving computational efficiency of the noted server systems.

Structural Variance Generation Machine Learning Models

FIG. 11 is a flowchart diagram of an example process 1100 for generating a variance report for a table data object. Via the various steps/operations of the process 1100, the predictive data analysis computing entity 106 can detect missing columns in table data objects as part of performing predictive structural analysis for table data objects.

The process 1100 begins at step/operation 1101 when the predictive data analysis computing entity 106 identifies the table data object. In some embodiments, the predictive data analysis computing entity 106 receives the table data object from a client computing entity 102. In some embodiments, the predictive data analysis computing entity 106 retrieves the table data object from the storage subsystem 108 of the predictive data analysis system 101. As described above, the table data object may describe a collection of inferred table columns, where the collection of inferred cell columns are determined by processing a collection of structured data cells, and where the collection of structured data cells comprise a group of header data cells and a group of value data cells. For example, the table data object may describe a collection of inferred cell columns that are determined by analyzing a collection of structured data cells described using a spreadsheet file, such as using a Microsoft Excel spreadsheet file. In an exemplary embodiments, a spreadsheet file may describe data associated with a provide roster used to report data associated with medical/healthcare providers to a health insurance provider. The spreadsheet file may then be analyzed to infer a group of inferred cell columns, which may for example be the columns defined by the spreadsheet file.

At step/operation 1102, the predictive data analysis computing entity 106 identifies a reference table data object. In some embodiments, the predictive data analysis computing entity 106 receives the reference table data object from a client computing entity 102. In some embodiments, the predictive data analysis computing entity 106 retrieves the reference table data object from the storage subsystem 108 of the predictive data analysis system 101.

At step/operation 1103, the predictive data analysis computing entity 106 extracts reference table column features for each reference table column of the reference table data object. Examples of reference table column features for a reference table column include at least one of a data type feature of the reference table column, a data pattern feature of the reference table column, a most frequent entity type feature of the reference table column, a sparsity feature of the reference table column, and an adjacent column name feature of the reference table column.

At step/operation 1104, the predictive data analysis computing entity 106 extracts table column features for each column of the table data object. Examples of table column features for a table column include at least one of a data type feature of the table column, a data pattern feature of the table column, a most frequent entity type feature of the table column, a sparsity feature of the table column, and an adjacent column name feature of the table column.

At step/operation 1105, the predictive data analysis computing entity 106 determines, for each table column pair that comprises a table column of the table data object and a reference table column of the reference table data object, a table column pair similarity measure. The table column similarity measure for a table column pair may be a measure of similarity of the table columns in the table column pair. An example of a table column similarity measure for a table column pair is a cosine similarity measure that is determined based at least in part on a vector representation of the table column features of the table column in the table column pair and a vector representation of the reference column features of the reference table column in the table column pair. In some embodiments, determining the table column pair similarity measure for a table column pair comprises generating a table column mapping for the table column in the table column pair in a multi-dimensional clustering space; generating a reference table column mapping for the reference table column in the table column pair in the multi-dimensional clustering space; and determining the table column pair similarity measure based at least in part on the table column mapping and the reference table column mapping.

At step/operation 1106, the predictive data analysis computing entity 106 determines a variance report for the table data object based at least in part on each table column pair similarity measure for a table column pair. In some embodiments, the variance report describes each table column of a table data object that is not associated with a threshold-satisfying (e.g., a threshold-exceeding) table column pair similarity measure with respect to a reference table data object. For example, in some embodiments, to determine the variance report for a table data object with respect to a reference table data object, the predictive data analysis computing entity performs the following operations: (i) for each table column, determining each table column pair similarity measure for a table column pair that comprises the table column and determining a subset of those table column pair similarity measures that exceed a table column pair similarity measure threshold, (ii) if the subset of those table column pair similarity measures for a table column that exceed the table column pair similarity measure threshold is empty, adopting the table column as part of the data described by the variance report.

At step/operation 1107, the predictive data analysis computing entity 106 performs one or more prediction-based actions based at least in part on the variance report. In some embodiments, the predictive data analysis computing entity 106 generates user interface data for a prediction output user interface that describes the table columns described by the variance report. An operational example of such a prediction output user interface 1200 is depicted in FIG. 12. As depicted in FIG. 12, the prediction output user interface describes that the variance report includes table columns TC1, TC2, and TC10.

By disclosing various structural variance generation machine learning models, various embodiments of the present invention introduce techniques for performing predictive structural analysis on structured cells in a manner that is configured to automate generating reliable schema metadata for the noted structured data cells. Inferring reliable structural metadata for a set of structured data cells reduces the need for users to browse such structured data cells in order to manually infer schema properties of those documents. By reducing the need for users to browse structured data cells in order to manually infer schema properties of those documents, various embodiments of the present invention reduce the computational resources needed to support such user actions, thus reducing computational load on server systems needed to support user interactions with those structural data cells, improving computational reliability of the noted server systems, and improving computational efficiency of the noted server systems.

Emergence Report Generation Machine Learning Models

FIG. 13 is a flowchart diagram of an example process 1300 for generating an emergence report for a set of table data columns. Via the various steps/operations of the process 1300, the predictive data analysis computing entity 106 can detect emerging trend in table column compositions across a set of table data columns as part of performing predictive structural analysis for the noted set of table data objects.

The process 1300 begins at step/operation 1301 when the predictive data analysis computing entity 106 identifies an unidentified table column set from the set of table data objects. An unidentified table column set may include a set of table columns that are deemed to be associated with a null overall column type prediction. For example, an unidentified table column may be a table column that is deemed to be associated with a null overall column type prediction as generated by the process 400 of FIG. 4. In some embodiments, each overall column type prediction for a table column in the unidentified table column set describes that the table column is not associated with a candidate table column type.

At step/operation 1302, the predictive data analysis computing entity 106 extracts unidentified table column features for each unidentified table column. Examples of unidentified table column features for an unidentified table column include at least one of a data type feature of the unidentified table column, a data pattern feature of the unidentified table column, a most frequent entity type feature of the unidentified table column, a sparsity feature of the unidentified table column, and an adjacent column name feature of the unidentified table column.

At step/operation 1303, the predictive data analysis computing entity 106 determines, for each column pair comprising a first unidentified table column in the unidentified table column set and a second unidentified table column in the unidentified table column set, a column pair similarity measure. The table column similarity measure for a table column pair may be a measure of similarity of the table columns in the table column pair. An example of a table column similarity measure for a table column pair is a cosine similarity measure that is determined based at least in part on a vector representation of the table column features of the first table column in the table column pair and a vector representation of the table column features of the second table column in the table column pair. In some embodiments, determining the table column pair similarity measure for a table column pair comprises generating a table column mapping for the first table column in the table column pair in a multi-dimensional clustering space; generating a table column mapping for the second table column in the table column pair in the multi-dimensional clustering space; and determining the table column pair similarity measure based at least in part on the two table column mappings.

At step/operation 1304, the predictive data analysis computing entity 106 determines, based at least in part on each column pair similarity measure, one or more unidentified table column groupings. In some embodiments, the unidentified table column grouping comprises a grouping of unidentified table columns from the unidentified table column set whose column pair similarity measures satisfy (e.g., exceed) a column pair similarity measure threshold.

At step/operation 1305, the predictive data analysis computing entity 106 performs one or more prediction-based actions based at least in part on the one or more unidentified table column groupings. In some embodiments, the predictive data analysis computing entity 106 generates user interface data for a prediction output user interface that describes an emergence report that describes the one or more unidentified table column groupings.

By disclosing various emergence report generation machine learning models, various embodiments of the present invention introduce techniques for performing predictive structural analysis on structured cells in a manner that is configured to automate generating reliable schema metadata for the noted structured data cells. Inferring reliable structural metadata for a set of structured data cells reduces the need for users to browse such structured data cells in order to manually infer schema properties of those documents. By reducing the need for users to browse structured data cells in order to manually infer schema properties of those documents, various embodiments of the present invention reduce the computational resources needed to support such user actions, thus reducing computational load on server systems needed to support user interactions with those structural data cells, improving computational reliability of the noted server systems, and improving computational efficiency of the noted server systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
identifying, by one or more processors, a reference table data object associated with a table data object, wherein (i) the table data object comprises a plurality of table columns and (ii) the reference table data object comprises a plurality of reference table columns;
extracting, by the one or more processors, a reference table column feature of a plurality of reference table column features for each of the plurality of reference table columns, wherein at least one reference table column feature of the plurality of reference table column features comprises a sparsity feature of the corresponding reference table column;
for each table column pair that comprises a table column of the table data object and a reference table column of the reference table data object, determining, by the one or more processors, a table column pair similarity measure based at least in part on a table column mapping and a reference table column mapping, wherein: (i) the reference table column mapping maps the corresponding reference table column to a multi-dimensional clustering space based at least in part on a defined set of table column features and (ii) the defined set of table column features comprises at least a sparsity feature of the corresponding table column;
determining, by the one or more processors and based at least in part on each table column pair similarity measure, a variance report for the table data object, wherein the variance report describes at least one table column that does not achieve a similarity threshold associated with its table column pair; and
initiating, by the one or more processors, the performance of one or more prediction-based actions based at least in part on the variance report.

2. The computer-implemented method of claim 1, further comprising:
identifying, by the one or more processors, an unidentified table column set of the plurality of table columns, wherein each overall column type prediction for a table column in the unidentified table column set describes that the table column is not associated with a candidate table column type; and generating, by the one or more processors, an overall unidentified table column report that describes one or more unidentified table column groupings as determined based at least in part on the unidentified table column set.

3. The computer-implemented method of claim 2, wherein determining the one or more unidentified table column groupings comprises:

for each unidentified table column of a plurality of unidentified table columns, determining, by the one or more processors, a plurality of unidentified table column features; and determining, by the one or more processors and based at least in part on each plurality of unidentified table column features for an unidentified table column, the one or more unidentified table column groupings of the plurality of unidentified table columns.

4. The computer-implemented method of claim 1, further comprising:

for each table column:

generating, by the one or more processors, using a header-based table classification machine learning model of a plurality of classification machine learning models and based at least in part on a table column name set for the table column, a predicted header-based column type of a plurality of predicted column types for the table column and a header-based column type voting weight of a plurality of column type voting weights for the predicted header-based column type;

generating, by the one or more processors, using a data-based table classification machine learning model of the plurality of classification machine learning models and based at least in part on a table column value set for the table column, a predicted data-based column type of the plurality of predicted column types for the table column and a data-based column type voting weight of the plurality of column type voting weights for the predicted data-based column type;

generating, by the one or more processors, using an entity recognition classification machine learning model of the plurality of classification machine learning models and based at least in part on the table column value set, a predicted entity-recognition-based column type of the plurality of predicted column types for the table column and an entity-recognition-based column type voting weight of the plurality of column type voting weights for the predicted entity-recognition-based column type;

generating, by the one or more processors, using a pattern matching classification machine learning model of the plurality of classification machine learning models and based at least in part on the table column name set, a predicted pattern-machine-based column type of the plurality of predicted column types for the table column and a pattern-matching-based column type voting weight of the plurality of column type voting weights for the predicted entity-recognition-based column type; and generating, by the one or more processors, using a voting machine learning model and based at least in part on the plurality of predicted column types and the plurality of column type voting weights, an overall column type prediction for the table column; and initiating, by the one or more processors, the performance of one or more second prediction-based actions based at least in part on each overall column type prediction for a table column.

5. The computer-implemented method of claim 4, wherein generating each overall column type prediction for a table column comprises:

for each candidate column type of a plurality of candidate column types:

identifying, by the one or more processors, a predicted column type set of the plurality of predicted column types for the table column that correspond to the candidate column type;

identifying, by the one or more processors, a column type voting weight set of the plurality of column type voting weights that correspond to the predicted column type set; and determining, by the one or more processors, a candidate column type voting value for the candidate column type with respect to the table column based at least in part on the column type voting weight set; and generating, by the one or more processors, the overall column type prediction based at least in part on each candidate column type voting value for a candidate column type with respect to the table column.

6. The computer-implemented method of claim 1, further comprising:

for each table column:

determining, by the one or more processors, using a table column clustering machine learning model and based at least in part on a plurality of table column features of the table column, a related table column cluster set for the table column; and determining, by the one or more processors, a functional grouping of the table column based at least in part on the related table column cluster set for the table column.

7. The computer-implemented method of claim 6, wherein the plurality of table column features comprises at least one of a data type feature of the table column, a data pattern feature of the table column, a most frequent entity type feature of the table column, the sparsity feature of the table column, or an adjacent column name feature of the table column.

8. A system comprising memory and one or more processors communicatively coupled to the memory, the one or more processors configured to:

identify a reference table data object associated with a table data object, wherein (i) the table data object comprises a plurality of table columns and (ii) the reference table data object comprises a plurality of reference table columns;

extract a reference table column feature of a plurality of reference table column features for each of the plurality of reference table columns, wherein at least one reference table column feature of the plurality of reference table column features comprises a sparsity feature of the corresponding reference table column;

for each table column pair that comprises a table column of the table data object and a reference table column of the reference table data object, determine a table column pair similarity measure based at least in part on a table column mapping and a reference table column mapping, wherein: (i) the reference table column mapping maps the corresponding reference table column to a multi-dimensional clustering space based at least in part on a defined set of table column features and (ii) the defined set of table column features comprises at least a sparsity feature of the corresponding table column;

determine, based at least in part on each table column pair similarity measure, a variance report for the table data object, wherein the variance report describes at least one table column that does not achieve a similarity threshold associated with its table column pair; and initiate the performance of one or more prediction-based actions based at least in part on the variance report.

9. The system of claim 8, wherein the one or more processors, are further configured to:

identify an unidentified table column set of the plurality of table columns, wherein each overall column type prediction for a table column in the unidentified table column set describes that the table column is not associated with a candidate table column type; and generate an overall unidentified table column report that describes one or more unidentified table column groupings as determined based at least in part on the unidentified table column set.

10. The system of claim 9, wherein determining the one or more unidentified table column groupings comprises:

for each unidentified table column of a plurality of unidentified table columns, determining a plurality of unidentified table column features; and determining, based at least in part on each plurality of unidentified table column features for an unidentified table column, the one or more unidentified table column groupings of the plurality of unidentified table columns.

11. The system of claim 8, wherein the one or more processors, are further configured to:

for each table column:

generate, using a header-based table classification machine learning model of a plurality of classification machine learning models and based at least in part on a table column name set for the table column, a predicted header-based column type of a plurality of predicted column types for the table column and a header-based column type voting weight of a plurality of column type voting weights for the predicted header-based column type;

generate, using a data-based table classification machine learning model of the plurality of classification machine learning models and based at least in part on a table column value set for the table column, a predicted data-based column type of the plurality of predicted column types for the table column and a data-based column type voting weight of the plurality of column type voting weights for the predicted data-based column type;

generate, using an entity recognition classification machine learning model of the plurality of classification machine learning models and based at least in part on the table column value set, a predicted entity-recognition-based column type of the plurality of predicted column types for the table column and an entity-recognition-based column type voting weight of the plurality of column type voting weights for the predicted entity- recognition-based column type;

generate, using a pattern matching classification machine learning model of the plurality of classification machine learning models and based at least in part on the table column name set, a predicted pattern-machine-based column type of the plurality of predicted column types for the table column and a pattern-matching-based column type voting weight of the plurality of column type voting weights for the predicted entity- recognition-based column type; and generate, using a voting machine learning model and based at least in part on the plurality of predicted column types and the plurality of column type voting weights, an overall column type prediction for the table column; and initiate the performance of one or more second prediction-based actions based at least in part on each overall column type prediction for a table column.

12. The system of claim 11, wherein generating each overall column type prediction for a table column comprises:

for each candidate column type of a plurality of candidate column types:

identifying a predicted column type set of the plurality of predicted column types for the table column that correspond to the candidate column type;

identifying a column type voting weight set of the plurality of column type voting weights that correspond to the predicted column type set; and determining a candidate column type voting value for the candidate column type with respect to the table column based at least in part on the column type voting weight set; and generating the overall column type prediction based at least in part on each candidate column type voting value for a candidate column type with respect to the table column.

13. The system of claim 8, wherein the one or more processors are further configured to:

for each table column:

determine, using a table column clustering machine learning model and based at least in part on a plurality of table column features of the table column, a related table column cluster set for the table column; and determine a functional grouping of the table column based at least in part on the related table column cluster set for the table column.

14. The system of claim 13, wherein the plurality of table column features comprises at least one of a data type feature of the table column, a data pattern feature of the table column, a most frequent entity type feature of the table column, the sparsity feature of the table column, or an adjacent column name feature of the table column.

15. One or more non-transitory computer-readable storage media including instructions that, when executed by one or more processors, cause the one or more processors to:

identify a reference table data object associated with a table data object, wherein (i) the table data object comprises a plurality of table columns and (ii) the reference table data object comprises a plurality of reference table columns;

extract a reference table column feature of a plurality of reference table column features for each of the plurality of reference table columns, wherein at least one reference table column feature of the plurality of reference table column features comprises a sparsity feature of the corresponding reference table column;

for each table column pair that comprises a table column of the table data object and a reference table column of the reference table data object, determine a table column pair similarity measure based at least in part on a table column mapping and a reference table column mapping, wherein: (i) the reference table column mapping maps the corresponding reference table column to a multi-dimensional clustering space based at least in part on a defined set of table column features and (ii) the defined set of table column features comprises at least a sparsity feature of the corresponding table column;

determine, based at least in part on each table column pair similarity measure, a variance report for the table data object, wherein the variance report describes at least one table column that does not achieve a similarity threshold associated with its table column pair; and initiate the performance of one or more prediction-based actions based at least in part on the variance report.

16. The one or more non-transitory computer-readable storage media of claim 15, wherein the instructions further cause the one or more processors to:

identify an unidentified table column set of the plurality of table columns, wherein each overall column type prediction for a table column in the unidentified table column set describes that the table column is not associated with a candidate table column type; and generate an overall unidentified table column report that describes one or more unidentified table column groupings as determined based at least in part on the unidentified table column set.

17. The one or more non-transitory computer-readable storage media of claim 16, wherein determining the one or more unidentified table column groupings comprises:

for each unidentified table column of a plurality of unidentified table columns, determining a plurality of unidentified table column features; and determining, based at least in part on each plurality of unidentified table column features for an unidentified table column, the one or more unidentified table column groupings of the plurality of unidentified table columns.

* * * * *

UNITED STATES PATENT AND TRADEMARK OFFICE
CERTIFICATE OF CORRECTION

PATENT NO. : 11,921,681 B2
APPLICATION NO. : 17/344489
DATED : March 5, 2024
INVENTOR(S) : Vijaychandar Natesan et al.

It is certified that error appears in the above-identified patent and that said Letters Patent is hereby corrected as shown below:

In the Claims

In Column 51, Line 15, Claim 9, delete "processors," and insert -- processors --, therefor.

In Column 51, Line 36, Claim 11, delete "processors," and insert -- processors --, therefor.

In Column 51, Line 64, Claim 11, delete "entity- recognition-based" and insert -- entity-recognition-based --, therefor.

In Column 52, Line 7, Claim 11, delete "entity- recognition-based" and insert -- entity-recognition-based --, therefor.

Signed and Sealed this
Fourth Day of June, 2024

Katherine Kelly Vidal
*Director of the United States Patent and Trademark Office*